(12) United States Patent
Hoffman et al.

(10) Patent No.: US 11,627,854 B2
(45) Date of Patent: Apr. 18, 2023

(54) DOCKING STATION FOR ROBOTIC CLEANER

(71) Applicant: SharkNinja Operating, LLC, Needham, MA (US)

(72) Inventors: Trevor Hoffman, Needham, MA (US); Andre D. Brown, Natick, MA (US); Andromeda Huffman, Wakefield, MA (US)

(73) Assignee: SharkNinja Operating LLC, Needham, MA (US)

( * ) Notice: Subject to any disclaimer, the term of this patent is extended or adjusted under 35 U.S.C. 154(b) by 402 days.

(21) Appl. No.: 16/659,925

(22) Filed: Oct. 22, 2019

(65) Prior Publication Data

US 2020/0121148 A1 Apr. 23, 2020

Related U.S. Application Data

(60) Provisional application No. 62/782,651, filed on Dec. 20, 2018, provisional application No. 62/748,807, filed on Oct. 22, 2018.

(51) Int. Cl.
*A47L 9/28* (2006.01)
*H02J 7/00* (2006.01)

(52) U.S. Cl.
CPC ............ *A47L 9/2873* (2013.01); *A47L 9/2894* (2013.01); *H02J 7/0045* (2013.01); *A47L 2201/022* (2013.01)

(58) Field of Classification Search
CPC .............................. A47L 9/2873; H02J 7/0045
(Continued)

(56) References Cited

U.S. PATENT DOCUMENTS

| 7,729,803 B2 | 6/2010 | Lim et al. |
| 8,871,030 B2 | 10/2014 | Chen et al. |

(Continued)

FOREIGN PATENT DOCUMENTS

| CN | 103948353 | 7/2014 |
| CN | 103948354 | 7/2014 |

(Continued)

OTHER PUBLICATIONS

PCT Search Report and Written Opinion dated Jan. 2, 2020, received in PCT Application No. PCT/US19/57349, 11 pgs.

(Continued)

*Primary Examiner* — Suchin Parihar
(74) *Attorney, Agent, or Firm* — Grossman Tucker Perreault & Pfleger, PLLC

(57) ABSTRACT

A docking station for a robotic cleaner may include a housing, at least one charging contact coupled to the housing, and at least three optical emitters disposed within the housing. The at least three optical emitters may include a first optical emitter configured to generate a first optical signal within a first field of emission, a second optical emitter configured to generate a second optical signal within a second field of emission, and a third optical emitter configured to generate a third optical signal within a third field of emission. The third optical emitter may be disposed between the first and second optical emitters. The first, second, and third optical signals may be different from each other. The third optical signal may be configured to guide a robotic cleaner in a direction of the housing.

18 Claims, 33 Drawing Sheets

(58) Field of Classification Search
    USPC .................................................. 320/107
    See application file for complete search history.

(56) References Cited

U.S. PATENT DOCUMENTS

| | | | |
|---|---|---|---|
| 8,972,060 | B2 | 3/2015 | Teng et al. |
| 9,052,720 | B2 | 6/2015 | Chan et al. |
| 9,149,170 | B2 | 10/2015 | Ozick et al. |
| 9,357,893 | B2 | 6/2016 | Lee |
| 9,476,771 | B2 | 10/2016 | Teng et al. |
| 9,520,731 | B2 | 12/2016 | Teng et al. |
| 9,687,130 | B2 | 6/2017 | Teng et al. |
| 9,751,214 | B2 | 9/2017 | Kim et al. |
| 9,851,711 | B2 | 12/2017 | Yoo et al. |
| RE47,264 | E | 3/2019 | Kim et al. |
| RE47,265 | E | 3/2019 | Kim et al. |
| 10,268,189 | B2 | 4/2019 | Yan |
| 2002/0120364 | A1 | 8/2002 | Colens |
| 2006/0087273 | A1* | 4/2006 | Ko ................. A47L 9/2805 318/587 |
| 2013/0214727 | A1 | 8/2013 | Teng et al. |
| 2017/0050311 | A1 | 2/2017 | Yoo et al. |
| 2017/0344014 | A1 | 11/2017 | Wu |
| 2018/0188737 | A1 | 7/2018 | Won et al. |
| 2018/0286147 | A1* | 10/2018 | Naito ................. G05D 1/0291 |

FOREIGN PATENT DOCUMENTS

| | | |
|---|---|---|
| EP | 2290490 B1 | 8/2013 |
| EP | 3054361 | 8/2016 |
| JP | 2007066292 | 3/2007 |
| JP | 2018007908 | 1/2018 |
| KR | 20180079054 | 7/2018 |
| WO | 2015127954 | 9/2015 |
| WO | 2015127954 A1 | 9/2015 |
| WO | 2017123136 A1 | 7/2017 |

OTHER PUBLICATIONS

Japanese Office Action with English translation dated Apr. 11, 2022, received in Japanese Patent Application No. 2021-521811, 14 pages.
Canadian Examiner Report dated May 20, 2022, received in Canadian Patent Application No. 3,117,300, 4 pages.
Chinese Office Action with English translation dated Jan. 30, 2022, received in Chinese Patent Application No. 201980069467.2, 11 pages.
Australian Examination Report dated Jan. 12, 2022, received in Australian Patent Application No. 2019365813, 3 pages.
Korean Office Action with English translations dated Aug. 2, 2022, received in Korean Patent Application No. 10-2021-7015235, 15 pages.
Extended European Search Report dated Aug. 8, 2022, received in European Patent Application No. 19875196.8, 8 pages.
Chinese Office Action with English summary dated Oct. 8, 2022, received in Chinese Patent Application No. 201980069467.2, 10 pages.
Canadian Office Action dated Jan. 31, 2023, received in Canadian Patent Application No. 3,117,300, 5 pages.
Korean Office Action with machine-generated translation, dated Feb. 10, 2023, received in Korean Patent Application No. 10-2021-7015235, 8 pages.

* cited by examiner

DOCKING STATION FOR ROBOTIC CLEANER

CROSS-REFERENCE TO RELATED APPLICATIONS

The present application claims the benefit of U.S. Provisional Application Ser. No. 62/748,807 filed on Oct. 22, 2018, entitled Docking Station for Robotic Cleaner and U.S. Provisional Application Ser. No. 62/782,651 filed on Dec. 20, 2018, entitled Docking Station for Robotic Cleaner, each of which are fully incorporated herein by reference.

TECHNICAL FIELD

The present disclosure is generally directed to a docking station for a robotic cleaner and more particularly to a docking station for a robotic cleaner configured to generate a signal for guiding the robotic cleaner to the docking station.

BACKGROUND INFORMATION

Robotic cleaners may include a chassis having one or more drive wheels coupled thereto for moving the robotic cleaner across a surface to be cleaned. The one or more drive wheels may be powered by one or more batteries electrically coupled thereto. Overtime the electrical power stored by the one or more batteries may fall below a threshold amount, indicating that the robotic cleaner should move to a location to have the one or more batteries recharged. For example, the robotic cleaner may move to a docking station configured to cause the one or more batteries to be recharged.

The docking station may be configured to emit one or more signals (e.g., optical signals) that can be detected by the robotic cleaner. The robotic cleaner may use the emitted signals to navigate to the docking station. For example, the docking station may emit a first and a second navigation signal that are configured to overlap and the robotic cleaner can be configured to determine whether the first, the second, or both the first and second signals are detected. Based on this determination, the robotic cleaner may adjust its movement direction such that the robotic cleaner can dock with the docking station. However, the robotic cleaner may not consistently obtain a proper alignment with the docking station when docking based on a detection of an overlap of two signals. As such, the robotic cleaner may be required to make adjustments (e.g., by moving) in order to obtain a proper alignment (e.g., to be sufficiently aligned to the docking station such that the one or more batteries can be recharged).

BRIEF DESCRIPTION OF THE DRAWINGS

These and other features and advantages will be better understood by reading the following detailed description, taken together with the drawings, wherein.

DETAILED DESCRIPTION

Figure 1A:
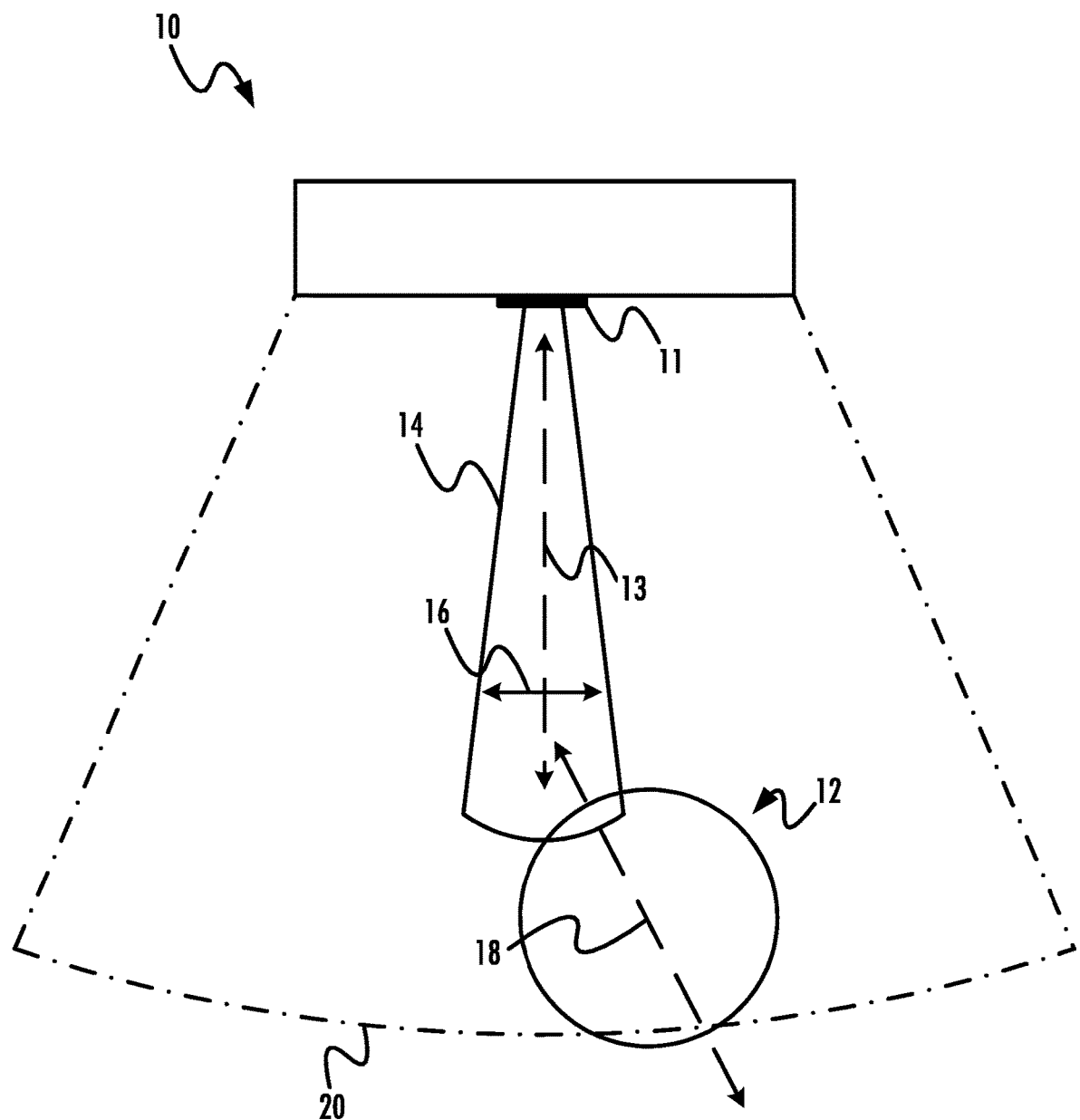
FIG. 1A is a schematic example of a docking station and a robotic cleaner, consistent with embodiments of the present disclosure.

The present disclosure is generally directed to a docking station for a robotic cleaner (e.g., a robotic vacuum cleaner). The docking station includes a housing, at least three signal emitters, and charging contacts configured to supply electrical power to a robotic cleaner. The at least three signal emitters are configured to emit a signal within a detection zone extending at least partially around the housing. A first and a second signal emitter can be arranged within the housing and configured to emit a first and second signal, respectively. The signals emitted from the first and second signal emitter may not have substantial overlap (e.g., not detectable by the robotic cleaner) within the detection zone. The third signal emitter can be configured to emit a third signal that extends between the first and second signals within the detection zone. The first, second, and third signals can be optical, acoustic, radio frequency, and/or any other type of signal. The first, second, and third signals can each have different properties (e.g., pulsed at different rates).

The robotic cleaner can be configured to adjust its movement path based, at least in part, on the detection of the first, second, or third signals. Detection of the first or second signal can cause the robotic cleaner to turn in a direction of the third signal. Detection of the third signal (e.g., in the absence of the first and second signals) can cause the robotic cleaner to follow the third signal until the robotic cleaner engages (e.g., contacts) the dock.

In some instances, the docking station can be configured such that the third signal can be detected in an absence of the first and second signals, at least within the detection zone. The portion of the detection zone in which the third signal can be detected in an absence of the first and second signals can be configured to be narrow, relative to the fields of emission of the first and second emitters. For example, the third emitter can be configured to generate a narrow field of emission and/or the field of emission of the third emitter can be configured to overlap a portion of the emission fields of the first and second emitters such that the portion of the detection zone in which the third signal can be detected in the absence of the first and second signals has a desired width. A measure of the width of the detection zone in which the third signal can be detected in the absence of the first and second signals may be based, at least in part, on desired alignment tolerances between the robotic cleaner and the docking station when the robotic cleaner engages (e.g., contacts) the docking station.

Improving the alignment of the robotic cleaner with the docking station, may result in more consistent docking. Therefore, operations such as recharging the robotic cleaner and/or evacuating debris from a dust cup of the robotic cleaner may be easier to accomplish. For example, when evacuating debris from a dust cup of the robotic cleaner, one or more evacuation ports may need to achieve a predetermined alignment in order for the dust cup to become fluidly coupled to the docking station.

FIG. 1A shows a schematic example of a docking station 10 and a robotic cleaner 12. As shown, the docking station 10 is configured to generate at least one docking signal 14 (e.g., an optical signal such as, for example, an infrared signal generated by a light emitting diode, an acoustic signal such as, for example, an ultrasonic signal generated by an acoustic transducer, and/or any other type of signal). The docking signal 14 is configured to guide the robotic cleaner 12 to the docking station 10. For example, when the robotic cleaner 12 detects the docking signal 14, the robotic cleaner 12 can be configured to follow the docking signal 14 until the robotic cleaner 12 engages (e.g., contacts) the docking station 10 such that, for example, the robotic cleaner 12 electrically couples to one or more charging contacts 11 of the docking station 10. An alignment of the robotic cleaner 12 with the docking station 10 (e.g., the orientation of the robotic cleaner 12 relative to the docking station 10) may be based, at least in part, on a width 16 of the docking signal 14. For example, a narrow width 16 may result in an axis 18 of the robotic cleaner 12 that extends parallel to a forward direction of travel of the robotic cleaner 12 being substantially aligned with, for example, a central axis 13 of the docking signal 14.

In some instances, the docking station 10 can be configured to generate a proximity signal 20 that extends from both sides of the docking station 10. The proximity signal 20 may indicate to the robotic cleaner 12 that the robotic cleaner 12 is proximate to the docking station 10. This may cause, for example, the robotic cleaner 12 to enter into a search routine in which the robotic cleaner 12 searches for the at least one docking signal 14. In some instances, the proximity signal 20 may be generated by at least two emitters, each emitter disposed on opposing sides of the docking station 10.

In some instances, the docking station 10 can be configured to move (e.g., slide or pivot) relative to the robotic cleaner 12 when the robotic cleaner 12 is engaging (e.g., contacting) the docking station 10. As such, if the robotic cleaner 12 is approaching the docking station 10 in a misaligned orientation (e.g., an orientation wherein the robotic cleaner 12 does not electrically couple to the docking station 10) the docking station 10 can be configured to move such that the robotic cleaner 12 can still be aligned with the docking station 10. In these instances, for example, only a single docking signal 14 may be used. When only a single docking signal 14 is used, the width 16 of the docking signal 14 may be based on a degree of movement (e.g., sliding or pivoting) through which the docking station 10 can move. As such, the width 16 of the docking signal 14 may be increased such that the robotic cleaner 12 can more easily locate the docking signal 14 without substantially impairing an ability of the robotic cleaner 12 to electrically couple to the docking station 10.

Figure 1B:
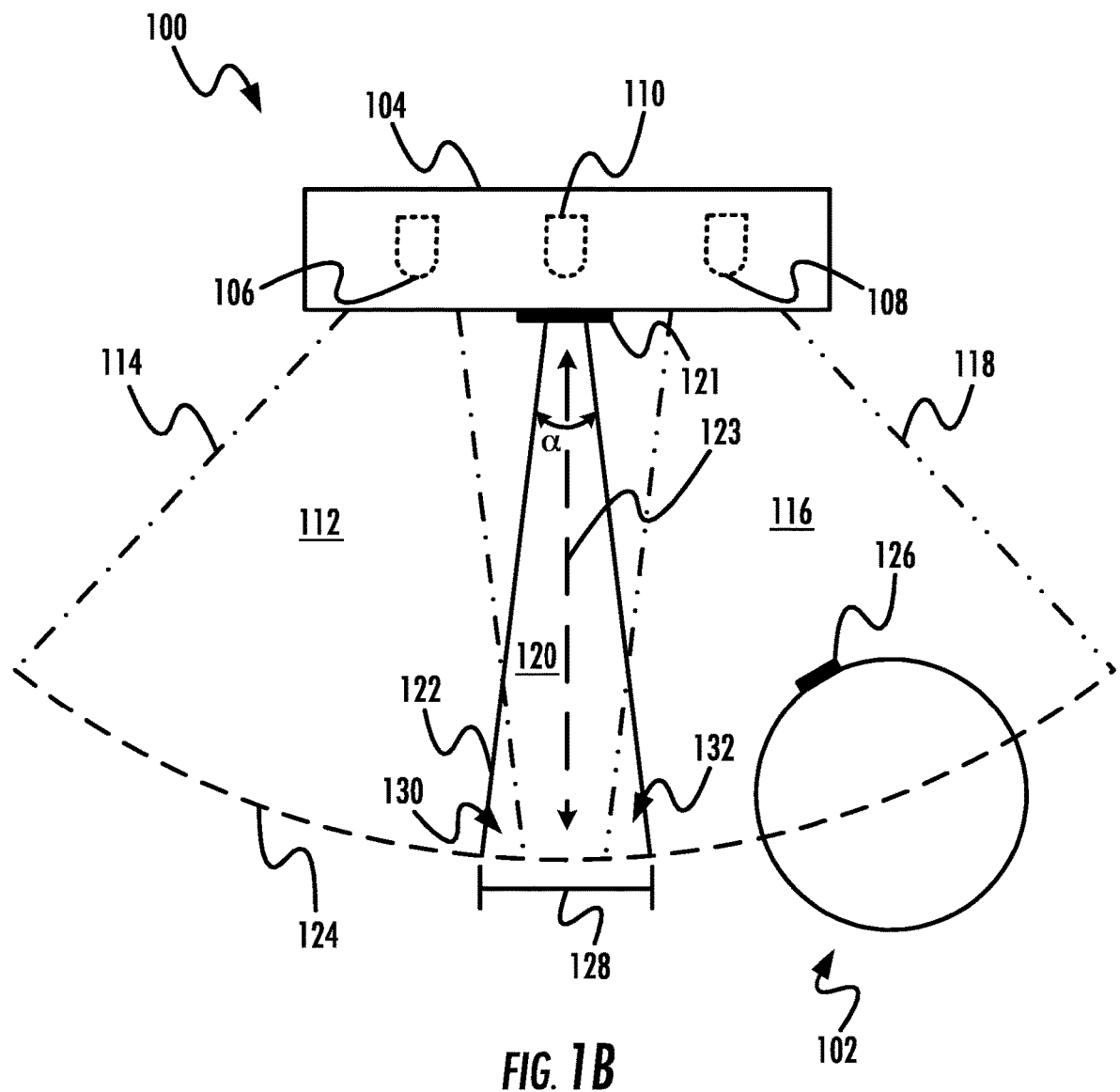
FIG. 1B is another schematic example of a docking station and a robotic cleaner, consistent with embodiments of the present disclosure.

FIG. 1B shows a schematic example of a docking station 100 and a robotic cleaner 102, which may be examples of the docking station 10 and the robotic cleaner 12 of FIG. 1A. As shown, the docking station 100 includes a housing 104 having a first optical emitter 106 (shown in hidden lines), a second optical emitter 108 (shown in hidden lines), and a third optical emitter 110 (shown in hidden lines) coupled thereto. As shown, the third optical emitter 110 is disposed between the first and second optical emitters 106 and 108. The first optical emitter 106 is configured to emit a first optical signal 112 within a first field of emission 114, the second optical emitter 108 is configured to emit a second optical signal 116 within a second field of emission 118, and the third optical emitter 110 is configured to emit a third optical signal 120 within a third field of emission 122. As shown, the first and second fields of emission 114 and 118 do not substantially overlap (e.g., any overlap is not detectable by the robotic cleaner 102) with each other within a detection zone 124 of the docking station 100. As also shown, the third field of emission 122 extends between the first and second fields of emission 114 and 118. The third field of emission 122 may overlap with at least a portion of one or more of the first and second fields of emission 114 and 118 within the detection zone 124. The detection zone 124 may generally be described as the area in which the signal strength of one or more of the optical signals 112, 116, and 120 is sufficient to be detected by the robotic cleaner 102 and/or is above a predetermined threshold.

The robotic cleaner 102 can have one or more sensors 126 configured to detect one or more of the optical signals 112, 116, and/or 120. For example, when the sensor 126 detects the second optical signal 116, the robotic cleaner 102 may be configured to turn towards the third field of emission 122 (e.g., turn left). When the robotic cleaner 102 detects the third optical signal 120, the robotic cleaner 102 can be configured to move such that the sensor 126 maintains detection of the third optical signal 120 (e.g., follows) while moving towards the docking station 100. As such, the robotic cleaner 102 can be guided to the docking station 100 using the third optical signal 120. Similarly, for example, when the sensor 126 detects the first optical signal 112, the robotic cleaner 102 can be configured to turn towards the third field of emission 122 (e.g., turn right) such that the robotic cleaner 102 can follow the third optical signal 120 to the docking station 100. For example, the third optical signal 120 can be used to guide the robotic cleaner to one or more charging contacts 121 of the docking station 100 such that the robotic cleaner 102 can electrically couple to the one or more charging contacts 121.

The alignment of the robotic cleaner 102 with the docking station 100 may be based, at least in part, on a width 128 of the third field of emission 122. The width 128 may be based, at least in part, on an emission angle α of the third emitter 110. As such, the area of the detection zone 124 in which the third optical signal 120 can be detected in the absence of the first and second optical signals 112 and 116 can be reduced by, for example, reducing the emission angle α. As the area of the detection zone 124 in which the third optical signal 120 can be detected is reduced, the alignment of the robotic cleaner 102 with the docking station 100 may be improved. For example, as the third field of emission 122 is narrowed the deviation of the robotic cleaner 102 from a center line 123 of the third field of emission may be reduced.

In some instances, and as shown, the first and second fields of emission 114 and 118 may overlap at least a portion of the third field of emission 122. In these instances, for example, when the robotic cleaner 102 detects a first overlap region 130 formed by the overlapping of the first and third fields of emission 114 and 122, the robotic cleaner 102 may turn towards a central portion of the third field of emission 122 (e.g., right). By way of further example, when the robotic cleaner 102 detects a second overlap region 132 formed by the overlapping of the second and third fields of emission 118 and 122, the robotic cleaner may turn towards a central portion of the field of emission 122 (e.g., left). When the robotic cleaner 102 is no longer within the first overlap region and second overlap region 130 and 132 and still detects the third optical signal 120, the robotic cleaner 102 may move towards the docking station 100 by maintaining a detection of the third optical signal 120 in the absence of the first and second signals 112 and 116. As such, improved alignment with the docking station 100 can be obtained by reducing the area within the detection zone 124 in which the robotic cleaner 102 does not detect the first optical signal 112 and/or the second optical signal 116 simultaneously with the third optical signal 120. Therefore, the deviation of the robotic cleaner 102 from the center line 123 may be reduced.

Figure 1C:
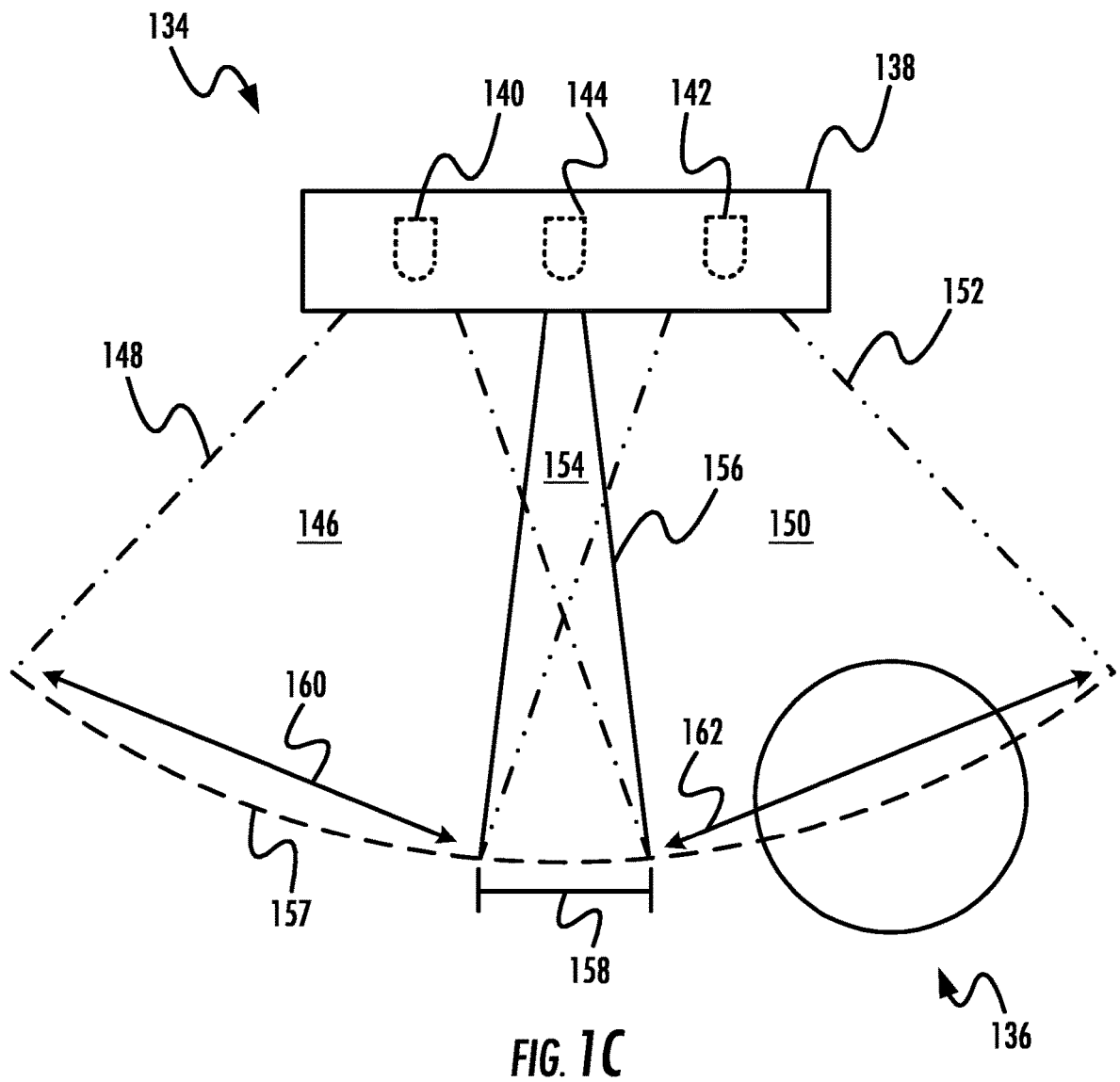
FIG. 1C is another schematic example of a docking station and a robotic cleaner, consistent with embodiments of the present disclosure.

FIG. 1C shows a schematic example of a docking station 134 and a robotic cleaner 136, which may be examples of the docking station 10 and the robotic cleaner 12 of FIG. 1A. As shown, the docking station 100 includes a housing 138 having a first optical emitter 140 (shown in hidden lines), a second optical emitter 142 (shown in hidden lines), and a third optical emitter 144 (shown in hidden lines). The first optical emitter 140 is configured to emit a first optical signal 146 within a first field of emission 148, the second optical emitter 142 is configured to emit a second optical signal 150 within a second field of emission 152, and the third optical emitter 144 is configured to emit a third optical signal 154 within a third field of emission 156. As shown, for at least a portion of a detection zone 157, at least a portion of the first second, and third fields of emission 148, 152, and 156 each overlap each other. The detection zone 157 may generally be described as the area in which the signal strength of one or more of the optical signals 146, 150, and 154 is sufficient to be detected by the robotic cleaner 136 and/or is above a predetermined threshold.

When the robotic cleaner 136 detects the first or second optical signal 146 or 150 in the absence of the third optical signal 154, the robotic cleaner 136 is configured to turn towards the third field of emission 156. When the robotic cleaner 136 detects the third optical signal 154, the robotic cleaner follows the third optical signal 154 until the robotic cleaner engages (e.g., contacts) the docking station 134. In other words, when the robotic cleaner 136 detects the third optical signal 154, the robotic cleaner 136 does not use the first and second optical signals 146 and 150 for navigation. The alignment with the robotic cleaner 136 relative to the docking station 134 may be improved by having a width 158 of the third field of emission 156 measure less than a width 160 and/or 162 of the first and/or second fields of emission 148 and/or 152.

Figure 2:
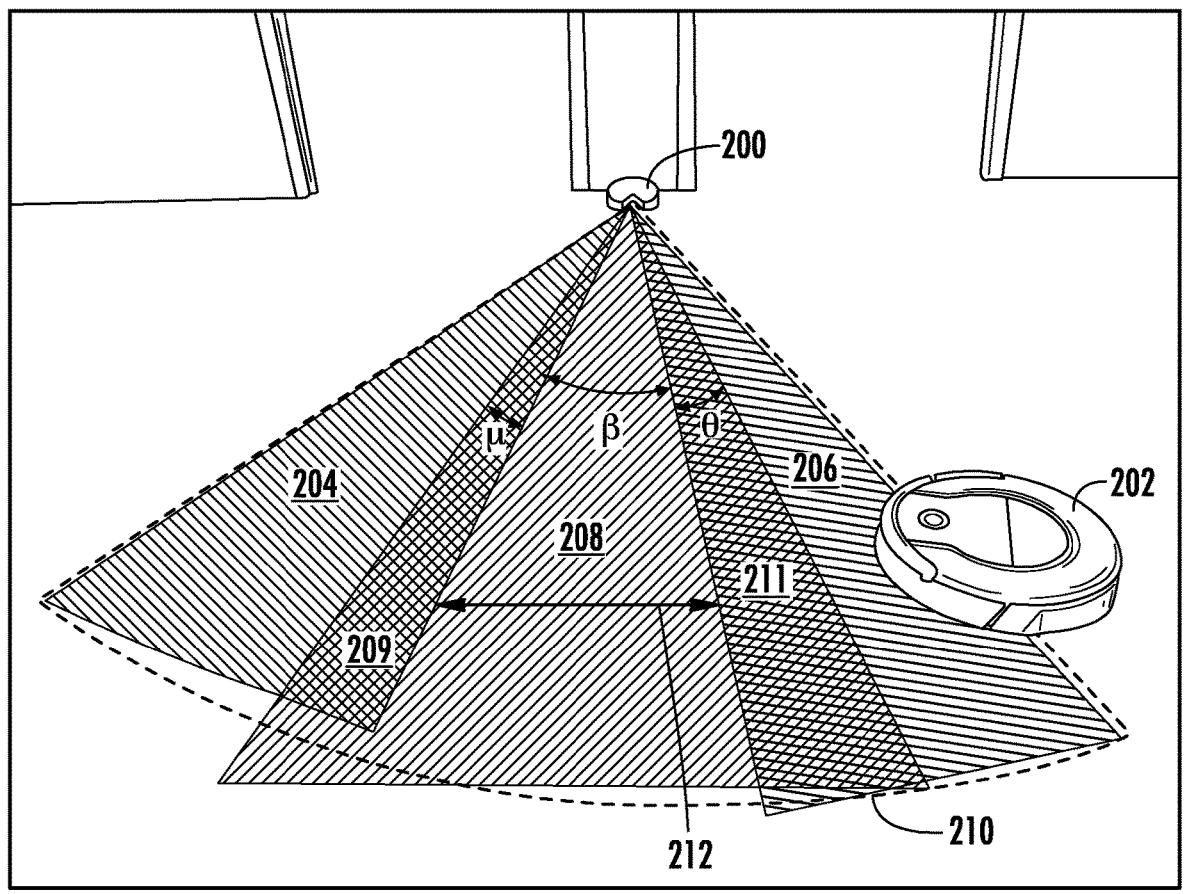
FIG. 2 is a perspective view of a docking station, which may be an example of the docking station of FIG. 1B, consistent with embodiments of the present disclosure.
Figure 4:
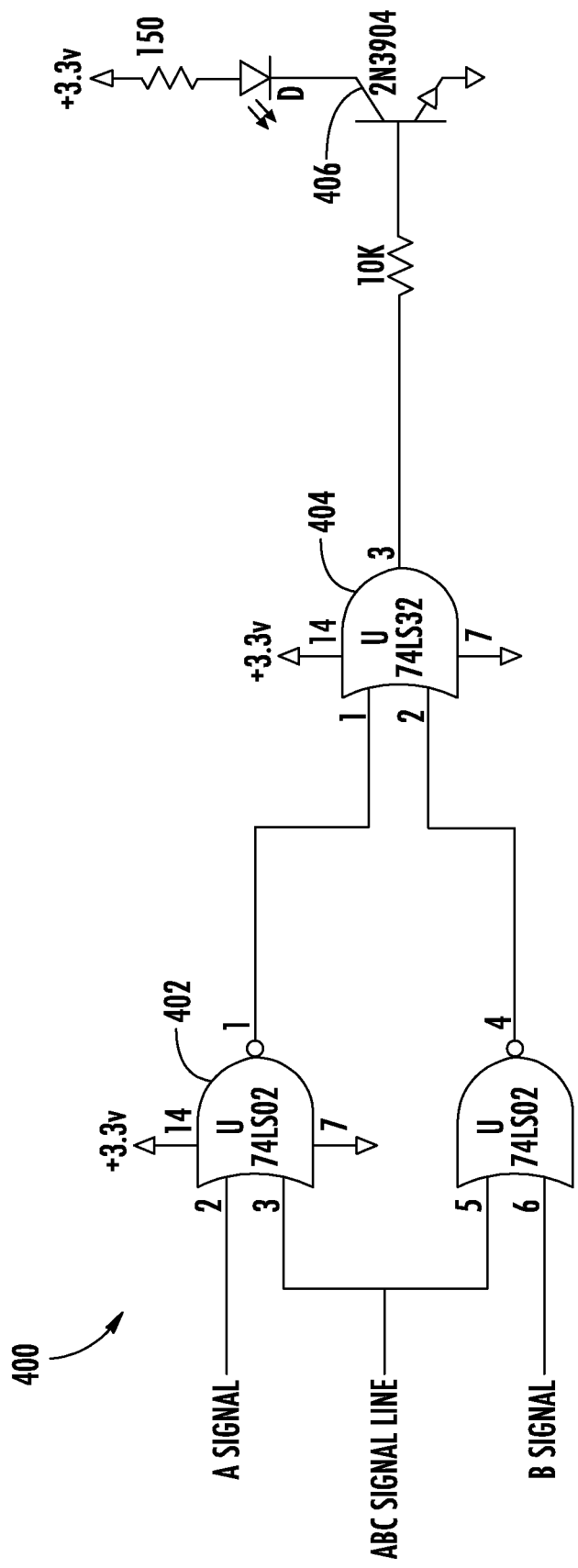
FIG. 4 is a circuit diagram of a circuit configured to combine a first and a second modulation signal to generate a third modulation signal, which may be used with the docking station of FIG. 2, consistent with embodiments of the present disclosure.

FIG. 2 shows a perspective view of a docking station 200, which may be an example of the docking station 100 of FIG. 1B, and a robotic vacuum cleaner 202, which may be an example of the robotic cleaner 102 of FIG. 1B. As shown, the docking station 200 is configured to generate a left signal 204, a right signal 206, and a middle (e.g., homing) signal 208. Each of the left, right, and middle signals 204, 206, and 208 may be modulated according to a respective modulation pattern such that the robotic vacuum cleaner 202 can differentiate between each of the generated signals. In some instances, for example, the middle signal 208 can be configured to resemble a signal similar to a signal that would be generated if the left and right signals 204 and 206 were to overlap within the detection zone 210 (FIG. 4 shows an example of a circuit configured to generate the middle signal 208 using modulation patterns of the left and right signals 204 and 206).

As shown, the left and right signals 204 and 206 do not overlap within a detection zone 210 extending around the docking station 200. As also shown, the left and right signals 204 and 206 may overlap with the middle signal 208 within the detection zone 210. As such, navigation of the robotic cleaner 202 to the docking station 200 may be based, at least in part, on which signals are detected.

For example, when attempting to locate the docking station 200, the robotic vacuum cleaner 202 may be configured to move in a direction of the middle signal 208 in response to detecting one of the left or right signals 204 or 206. The robotic vacuum cleaner 202 may determine that it is moving towards the middle signal 208 by detecting a respective overlap region 209 or 211 corresponding to an overlap between the middle signal 208 and a respective one of the left or right signals 204 or 206. When a respective one of the overlap regions 209 or 211 is detected, the robotic vacuum cleaner 202 may continue to move according to its current orientation until the middle signal 208 is detected in the absence of the left and right signals 204 and 206. The robotic vacuum cleaner 202 may then orient itself to move in a direction towards the docking station 200. If, after detecting the middle signal 208 in the absence of the left and right signals 204 and 206, the robotic vacuum cleaner 202 encounters a respective overlap region 209 or 211, the robotic vacuum cleaner 202 can be configured to turn in a direction away from the overlap region 209 or 211. In other words, the robotic vacuum cleaner 202 may move back and forth between the overlap regions 209 and 211 until the robotic vacuum cleaner 202 engages (e.g., contacts) the docking station 200 and/or obtains a desired orientation that is generally aligned with the docking station 200.

A separation distance 212 extending between the left signal 204 and the right signal 206 as measured at 2.13 meters (m) from the docking station 200 may measure in a range of 25.4 centimeters (cm) and 66 cm. By way of further example, the separation distance 212 as measured at 2.13 m from the docking station 200 may measure about 45.7 cm. When the separation distance 212 as measured at 2.13 m from the dock is about 45.7 cm an angle β between the left and right signals 204 and 206 may measure about 12.2°.

An overlap angle μ that extends between a left edge of the middle signal 208 and a right edge of the left signal 204 may measure, for example, in a range of 3° and 7°. By way of further example, the overlap angle μ may measure about 4.7°. Similarly, an overlap angle Θ that extends between a right edge of the middle signal 208 and a left edge of the right signal 206 may measure, for example, in a range of 3° and 7°. By way of further example, the overlap angle Θ may measure about 4.7°. In some instances, at least two of the angle β, the overlap angle μ, and/or the overlap angle Θ may measure substantially the same.

Figure 3:
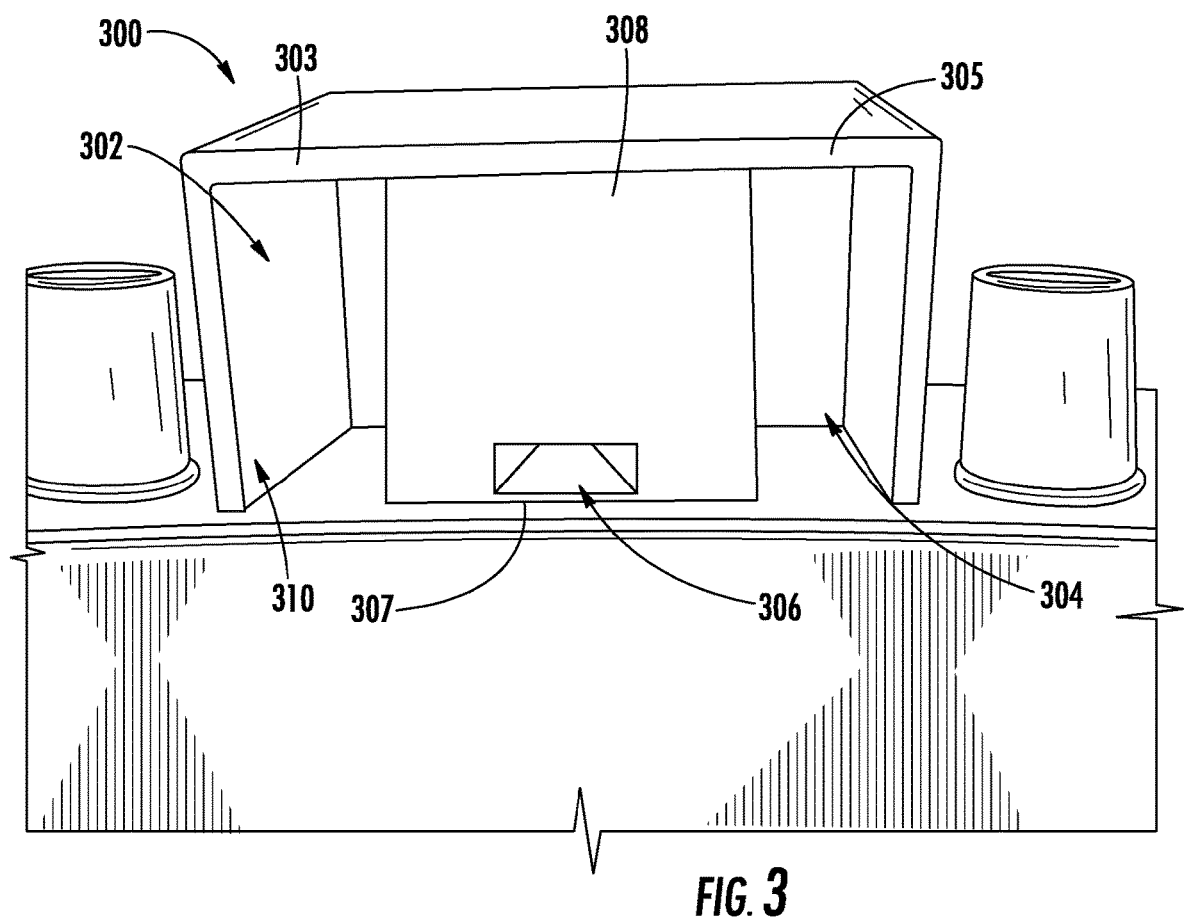
FIG. 3 is a perspective view of a transmitter shadow box housing, which may be capable of being used with the docking station of FIG. 2, consistent with embodiments of the present disclosure.

FIG. 3 shows a perspective view of an example of a transmitter shadow box housing 300 disposed within the docking station 200. As shown, the transmitter shadow box housing 300 may include a left shadow box 303 defining a left emitter transmitter compartment 302, a right shadow box 305 defining a right emitter transmitter compartment 304, and a middle shadow box 307 defining a middle emitter transmitter compartment 306. Each compartment 302, 304, and 306 is configured to receive a respective emitter. As shown, at least a portion of the left and right emitter compartments 302 and 304 may be obscured by a light shield 308. The light shield 308 is configured to block a portion of the light generated by respective emitters within the left and right emitter compartment 302 and 304. By blocking a portion of the generated light, the left and right signals 204 and 206 may be prevented from overlapping within the detection zone 210.

In some instances, the left and right emitters can be configured to be vertically offset from the middle emitter. For example, the middle emitter may be disposed below the left and right emitters and the left and right emitters may be disposed on a common horizontal plane. In some instances, the left, right, and middle emitter may each be arranged on a common horizontal plane. For example, the horizontal plane may be substantially aligned with one or more corresponding receivers on the robotic vacuum cleaner 202.

The inner sidewalls 310 of the left, right, and middle compartments 302, 304, and 306 may be reflective or non-reflective to the emitted light. When the inner sidewalls 310 are non-reflective internal reflections within the compartments 302, 304, and 306 may be reduced. However, such a configuration may result in the diffusion of at least a portion of the light, some of which may escape a respective compartment 302, 304, or 306. Changing a geometry and/or size of the compartments 302, 304, and 306 and/or the light shield 308 may change the size and/or shape of the left, right, and middle signals 204, 206, and 208.

FIG. 4 shows a circuit diagram 400 of a circuit configured to generate the middle signal 208 using the modulation patterns of the emitters corresponding to the left and right signals 204 and 206. As shown the circuit includes a plurality of NOR gates 402, each configured to receive a respective modulation pattern corresponding to one of the left or right signal 204 or 206, an OR gate 404 configured to combine the modulation patterns, and an NPN transistor 406 for inverting the combined signal, the inverted signal being used to generate the middle signal 208.

Figure 5:
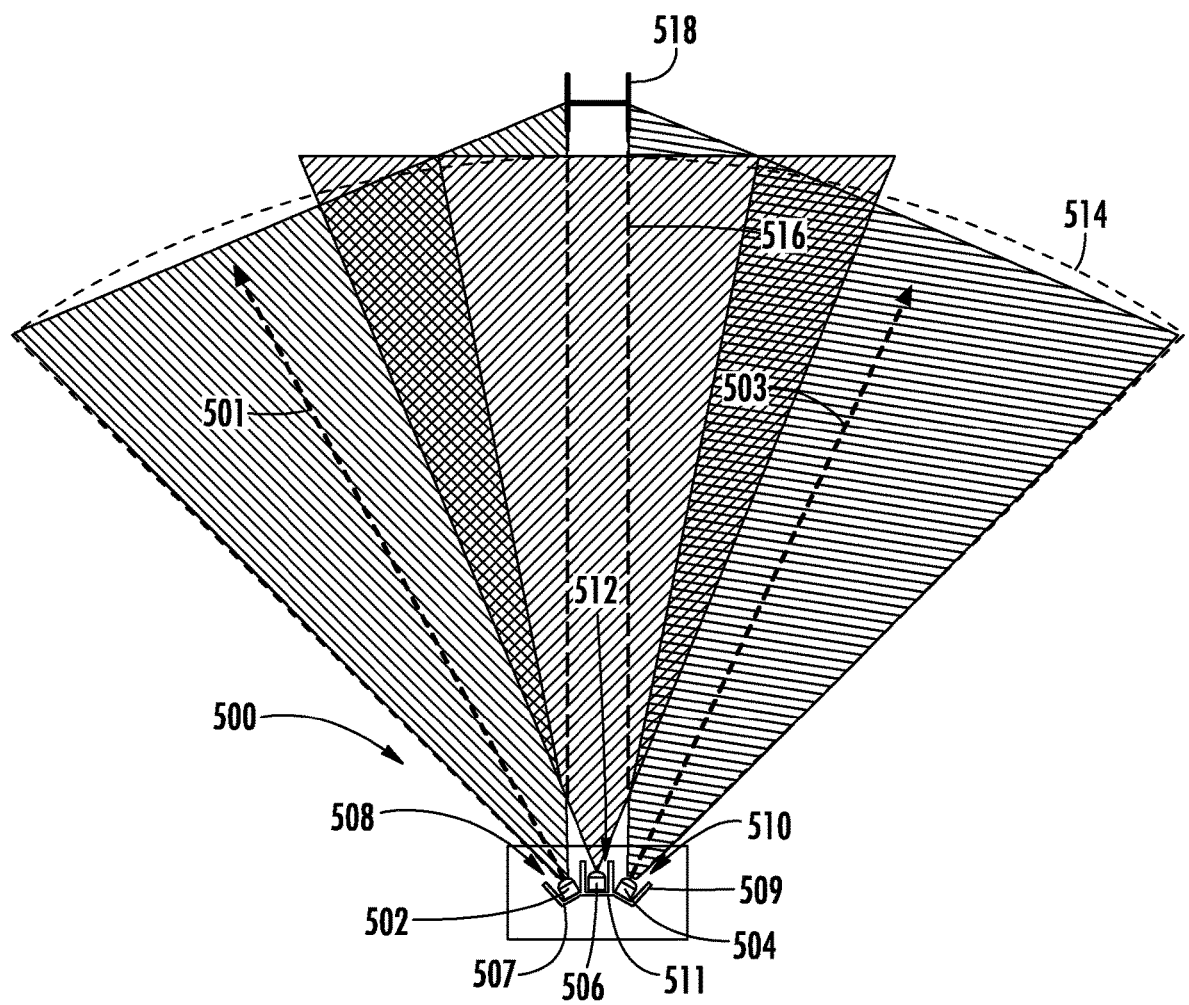
FIG. 5 is a schematic view of a transmitter shadow box housing that is capable of being used with, for example, the docking station of FIG. 1B, consistent with embodiments of the present disclosure.

FIG. 5 shows a schematic view of a transmitter shadow box housing 500 configured to be used with, for example, the docking station 100 of FIG. 1B. As shown, the transmitter shadow box housing 500 can include a first optical emitter 502, a second optical emitter 504, and a third optical emitter 506, wherein the third optical emitter 506 is disposed between the first and second optical emitters 502 and 504. A first central axis 501 of the first optical emitter 502 may diverge from a second central axis 503 of the second optical emitter 504 with increasing distance from the transmitter shadow box housing 500 in an emission direction of the first, second, and third optical emitters 502, 504, and 506. In other words, the first and second optical emitters 502 and 504 may emit light in diverging directions.

The transmitter shadow box housing 500 can include a plurality of shadow boxes 507, 509, and 511 that define transmitter compartments 508, 510, and 512 configured to receive a respective one of the first, second, and third optical emitters 502, 504, and 506. Each of the compartments 508, 510, and 512 can be configured to shape and/or direct the emitted light. For example, the first and second compartments 508 and 510 can be configured to shape and/or direct the light emitted by the first and second optical emitters 502 and 504, respectively, such that the light emitted by the first and second optical emitters 502 and 504 does not substantially overlap (e.g., any overlap is not detectable by a robotic cleaner) within a detection zone 514 of the docking station. The third compartment 512 can be configured to shape and/or direct the light emitted by the third optical emitter 506 such that at least a portion of the light emitted by the third optical emitter 506 overlaps with at least a portion of the light emitted by the first and second optical emitters 502 and 504.

As shown, the transmitter shadow box housing 500 can be configured such that, when light is emitted from each of the first, second, and third optical emitters 502, 504, and 506, there is a docking region 516 within the detection zone 514 that extends between light emitted by the first and second optical emitters 502 and 504. In other words, when in this region, a robotic cleaner detects the light emitted by the third optical emitter 506 in the absence of the light emitted by the first and second optical emitters 502 and 504. A width 518 of the docking region 516 can be narrowed by increasing the overlap of the light generated by one or more of the first and second optical emitters 502 and 504 with the light generated by the third optical emitter 506. When the robotic cleaner follows the light generated by the third optical emitter 506, the alignment of the robotic cleaner relative to the docking station may be improved by narrowing the width 518 of the docking region 516. In some instances, the width 518 may measure substantially constant for a majority (e.g., at least 75%, at least 80%, at least 85%, at least 90%, at least 95%, or at least 99%) of the detection zone 514.

Figure 6:
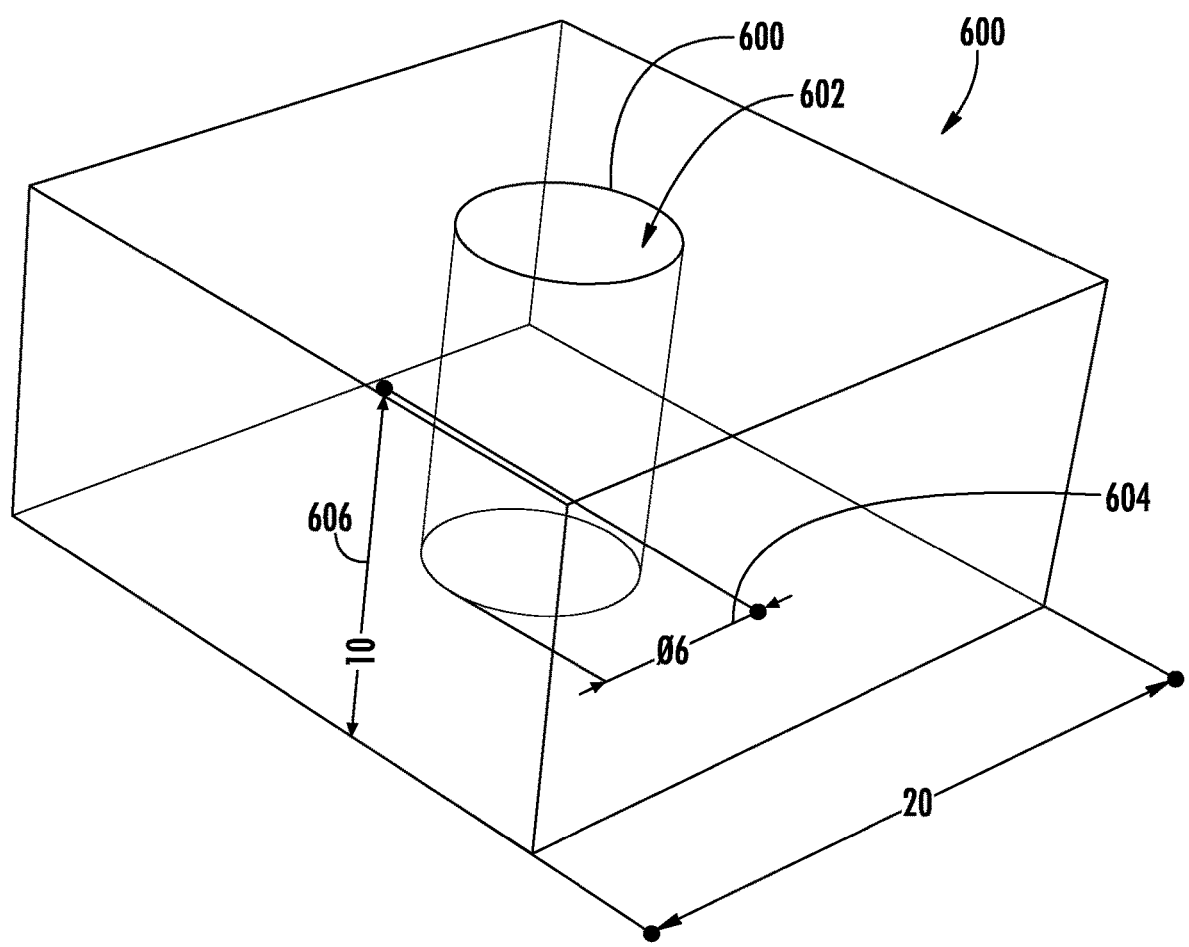
FIG. 6 is a schematic view of a transmitter shadow box that is capable of being used with, for example, the docking station of FIG. 1B, consistent with embodiments of the present disclosure.

FIG. 6 shows an example of a transmitter shadow box 600 (shown as transparent for purposes of clarity), which may be configured to be used with, for example, the docking station 100 of FIG. 1B. As shown, the transmitter shadow box 600 defines at least one cylindrical transmitter compartment 602. The cylindrical compartment 602 is configured to receive a respective optical emitter (e.g., one of the first, second, and third optical emitters 502, 504, and 506). A diameter 604 of the cylindrical compartment 602 may measure, for example, about 6 millimeters (mm) and a height 606 of the cylindrical compartment 602 may measure, for example, about 10 mm. As also shown, the cylindrical compartment 602 may be centered within the transmitter shadow box 600. In some instances, when a plurality of the transmitter shadow boxes 600 are included within a shadow box housing, a separation distance between a center of two adjacent cylindrical compartments 602 may measure, for example, about 20 mm.

Figure 7:
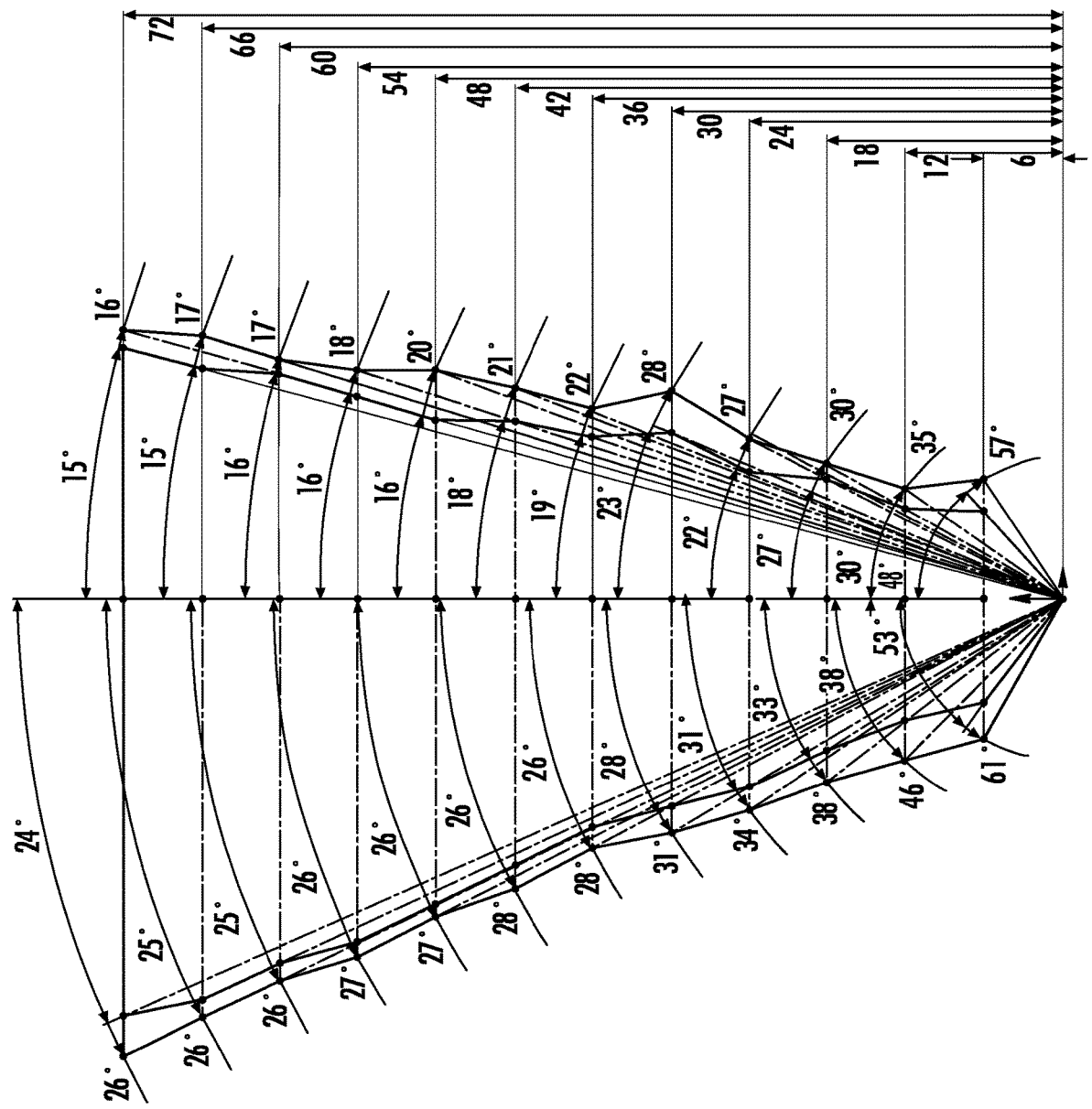
FIG. 7 shows an example of a field of emission for the transmitter shadow box housing of FIG. 6, consistent with embodiments of the present disclosure.

FIG. 7 shows an example of a field of emission (or a light spread) for an emitter disposed within the transmitter shadow box 600 when the transmitter shadow box 600 is formed from a foam. The spread is shown for a range extending up to 182.88 centimeters (cm).

Figure 8:
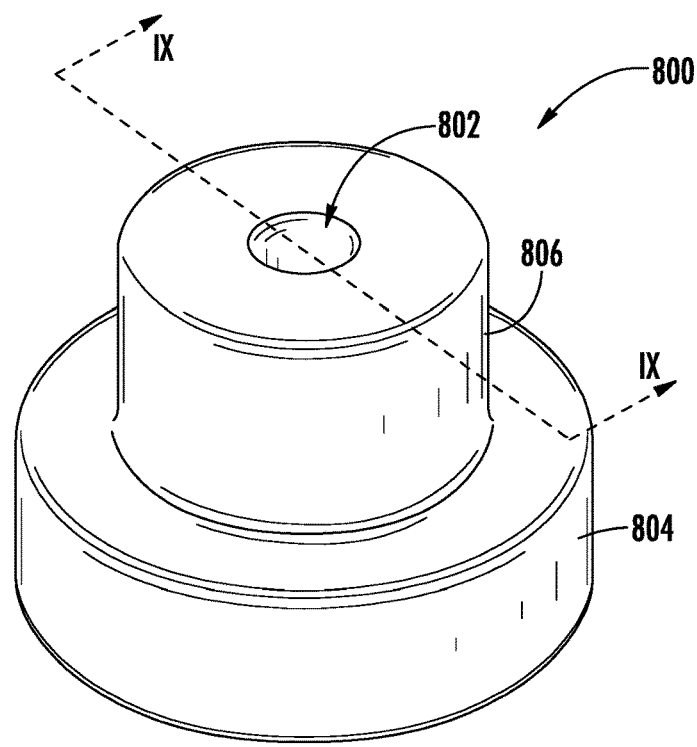
FIG. 8 shows a perspective view of a cylindrical transmitter shadow box that is capable of being used with, for example, the docking station of FIG. 1B, consistent with embodiments of the present disclosure.

FIG. 8 shows a perspective view of a cylindrical transmitter shadow box 800, which may be configured to be used with, for example, the docking station 100 of FIG. 1B. The transmitter shadow box 800 includes a cylindrical transmitter compartment 802, wherein at least a portion of the cylindrical compartment 802 is configured to receive a respective emitter (e.g., one of the first, second, and third optical emitters 502, 504, and 506). In some instances, a plurality of cylindrical transmitter shadow boxes 800 may be included within a transmitter shadow box housing.

As shown, the cylindrical transmitter shadow box 800 includes a first cylindrical portion 804 and a second cylindrical portion 806 extending from the first cylindrical portion 804, wherein a diameter of the second cylindrical portion 806 measures less than a diameter of the first cylindrical portion 804. As shown, the first and second cylindrical portion 804 and 806 may be concentrically arranged.

Figure 9:
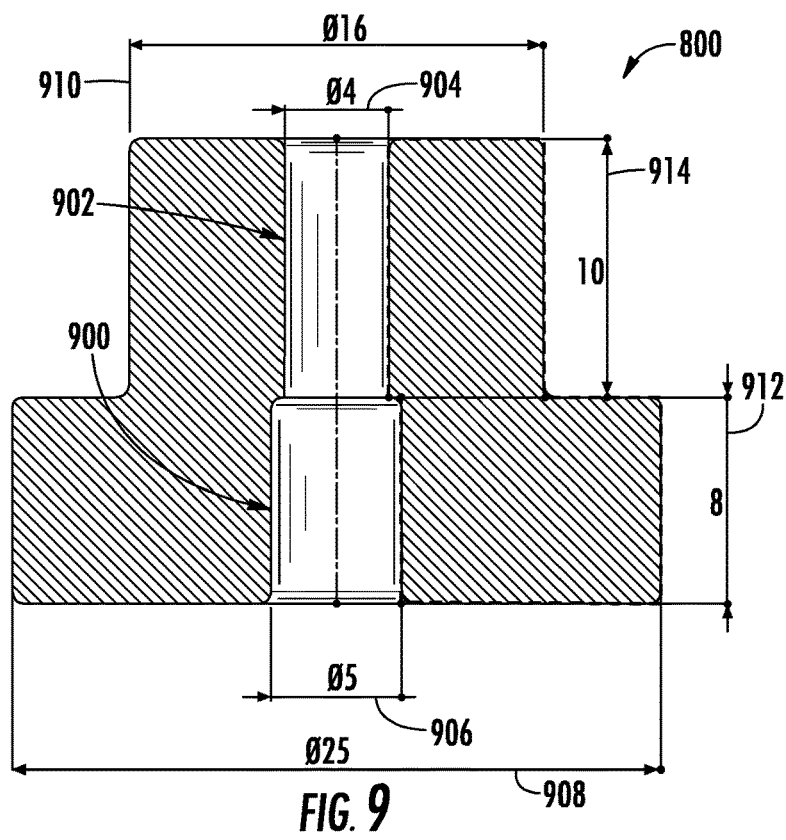
FIG. 9 shows a cross-sectional view of the cylindrical transmitter shadow box of FIG. 8 taken along the line IX-IX, consistent with embodiments of the present disclosure.

FIG. 9 shows a cross-sectional view of the cylindrical transmitter shadow box 800 taken along the line IX-IX of FIG. 8. As shown, the cylindrical compartment 802 may define a first cavity 900 and a second cavity 902. The first cavity 900 may be defined in the first cylindrical portion 804 and may be configured to receive a respective emitter (e.g., one of the first, second, and third optical emitters 502, 504, and 506) and the second cavity 902 may be defined in the second cylindrical portion 806 and may have a diameter 904 that measures less than a diameter 906 of the first cavity 900, the diameter 906 of the first cavity 900 may correspond to a diameter of the emitter received therein. The second cavity 902 can be configured to at least partially collimate light generated by the emitter.

As shown, the diameter 906 of the first cavity 900 may measure about 5 mm and the diameter 904 of the second cavity 902 may measure about 4 mm. As also shown, a first cylindrical portion diameter 908 may measure about 25 mm, a second cylindrical portion diameter 910 may measure about 16 mm, a first cylindrical portion height 912 may measure about 8 mm, and a second cylindrical portion height 914 may measure about 10 mm.

Figure 10:
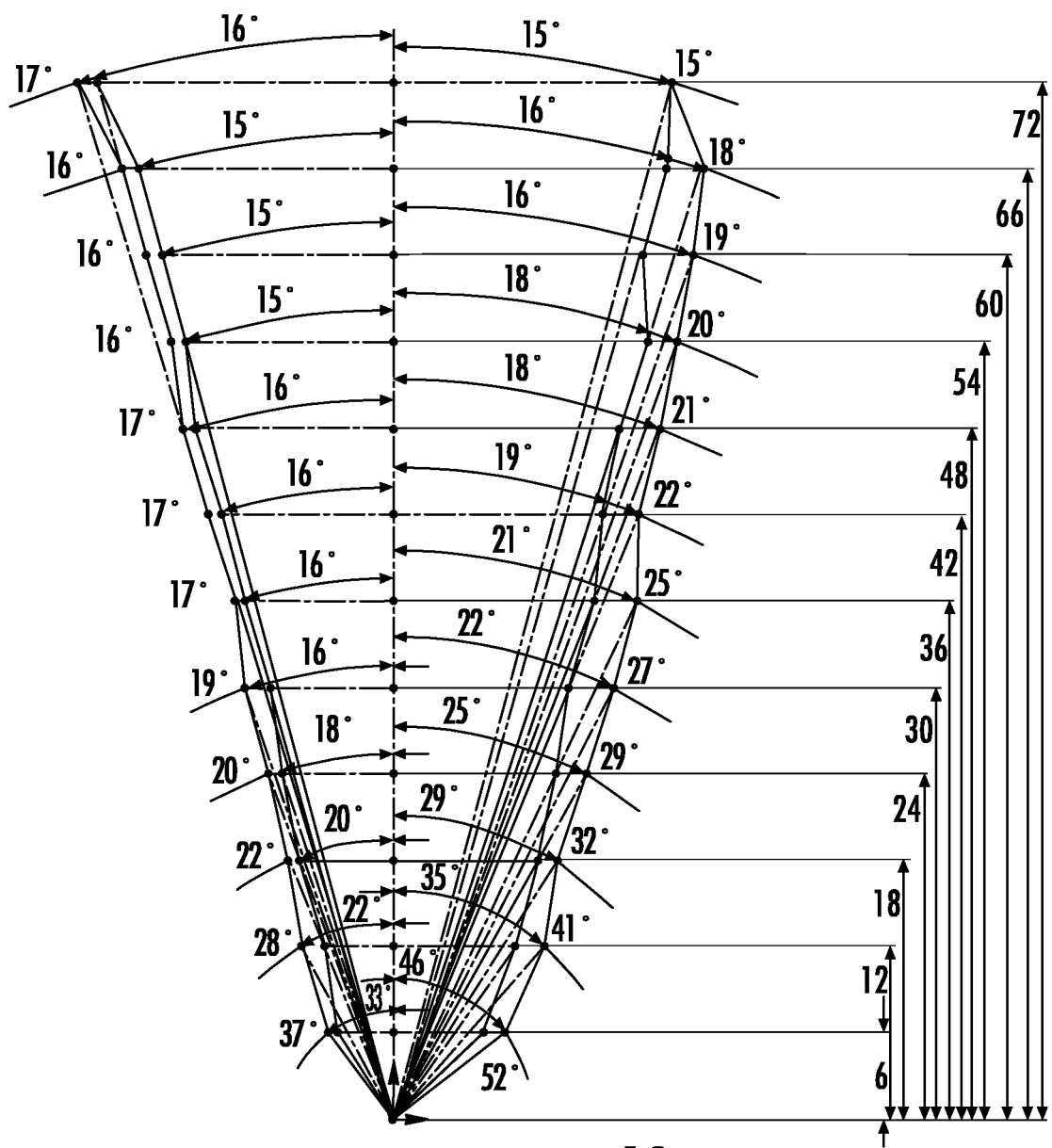
FIG. 10 shows an example of a field of emission for the transmitter shadow box of FIG. 8, consistent with embodiments of the present disclosure.

FIG. 10 shows an example of a field of emission (or a light spread) for an emitter disposed within the transmitter shadow box 800 when the transmitter shadow box 800 is formed from Polyoxymethylene (e.g., as offered for sale by DuPont under the tradename DELRIN). The spread is shown for a range extending up to 182.88 cm.

Figure 11:
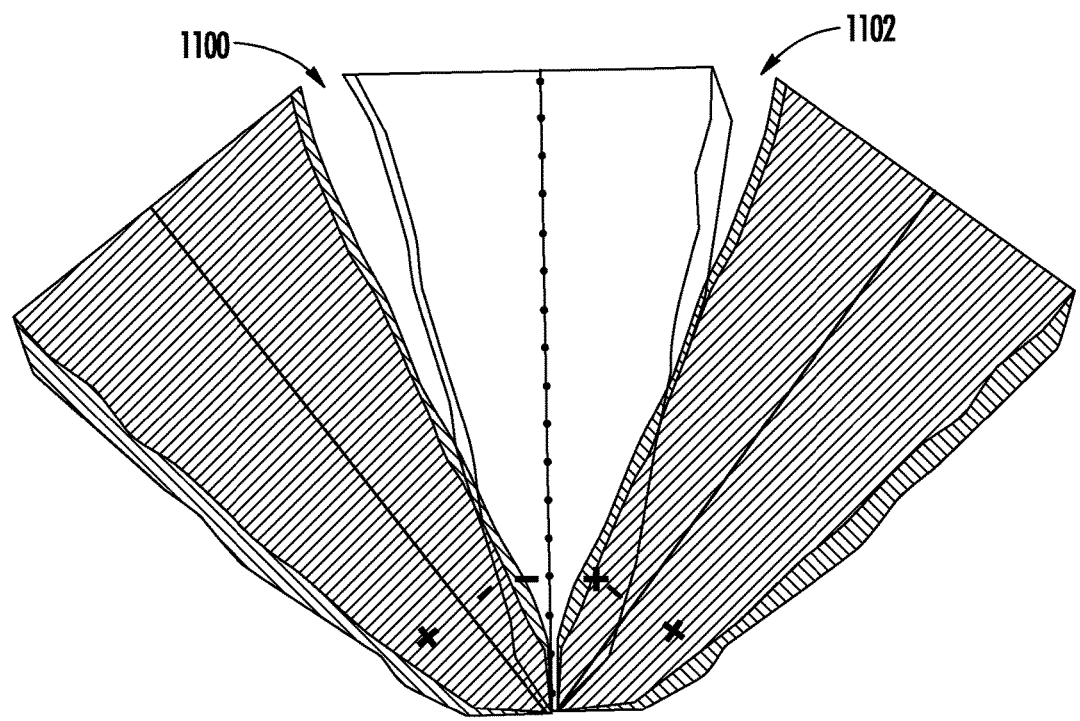
FIG. 11 shows an example of fields of emission for three emitters, each disposed within a respective transmitter shadow box of FIG. 8, consistent with embodiments of the present disclosure.
Figure 12:
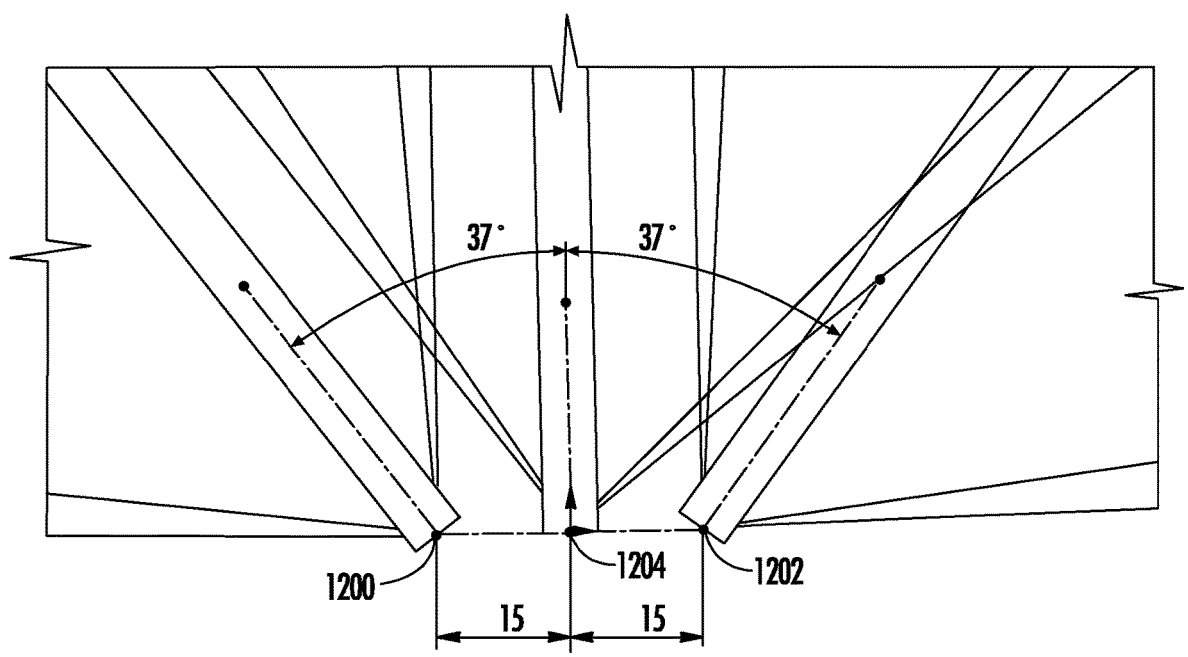
FIG. 12 shows an orientation of the emitters of FIG. 11, consistent with embodiments of the present disclosure.

FIG. 11 shows an example of fields of emission for three emitters, each disposed within a respective transmitter shadow box 800 in an orientation corresponding to that shown in FIG. 12. As shown, in FIG. 12 each of the emitters 1200, 1202, and 1204 are spaced apart from each other and the first and second emitters 1200 and 1202 are angled relative to the third emitter 1204. For example, each of the emitters 1200, 1202, and 1204 may be spaced apart from each other by about 15 mm and are oriented such that adjacent emitters are angled relative to each other by about 37°. As shown in FIG. 11, such a configuration may result in gaps 1100 and/or 1102 between the emission field of the third emitter 1204 and respective emission fields of the first and second emitters 1200 and 1202.

Figure 13:
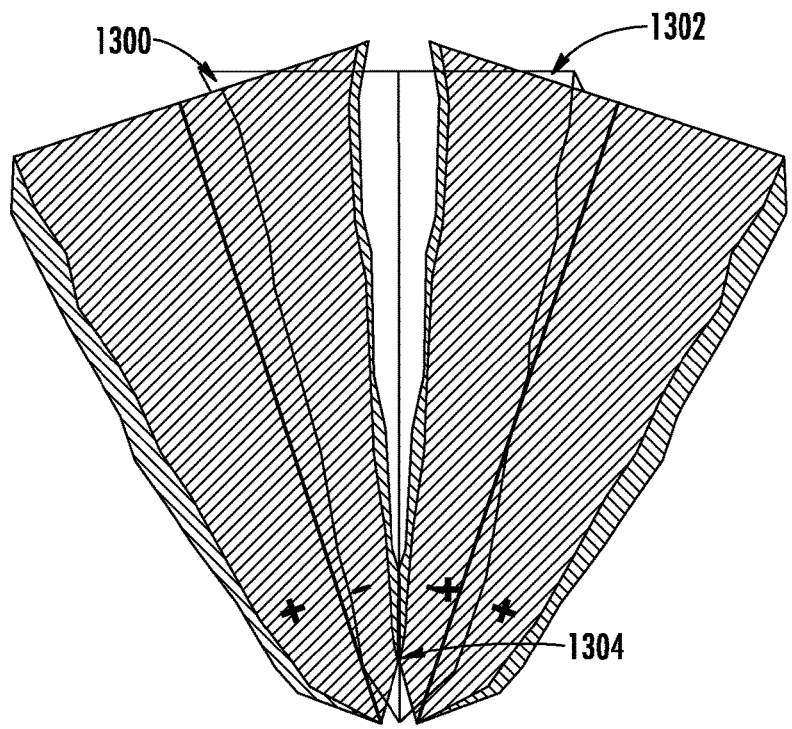
FIG. 13 shows another example of fields of emission for three emitters, each disposed within a respective transmitter shadow box of FIG. 8, consistent with embodiments of the present disclosure.
Figure 14:
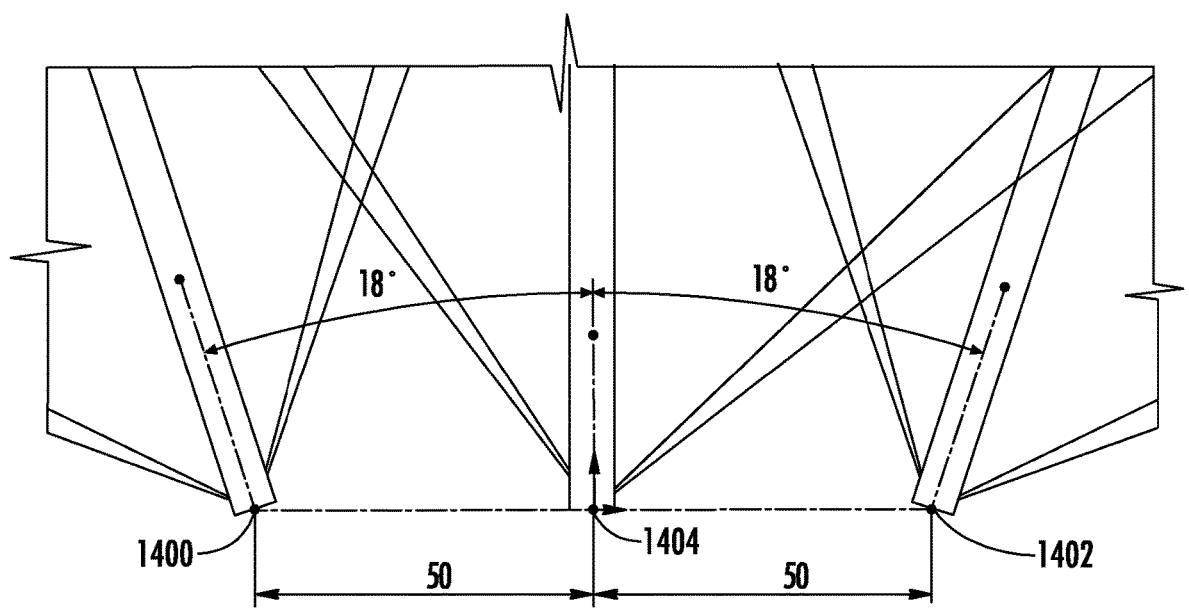
FIG. 14 shows an orientation of the emitters of FIG. 13, consistent with embodiments of the present disclosure.

FIG. 13 shows an example of fields of emission for three emitters, each disposed within a respective transmitter shadow box 800 in an orientation corresponding to that shown in FIG. 14. As shown in FIG. 14, each of the emitters 1400, 1402, and 1404 are spaced apart from each other and the first and second emitters 1400 and 1402 are angled relative to the third emitter 1404. For example, the first, second, and third emitters 1400, 1402, and 1404 may be spaced apart by about 50 mm and are oriented such that adjacent emitters are angled relative to each other by about 18°. As shown in FIG. 13, such a configuration may result in overlap regions 1300 and/or 1302 between the emission field of the third emitter 1404 and respective emission fields of the first and second emitters 1400 and 1402. A narrowest width 1304 extending between the emission fields of the first and second emitters 1400 and 1402 may indicate that a robotic cleaner is about to engage (e.g., contact) a docking station.

Figure 15:
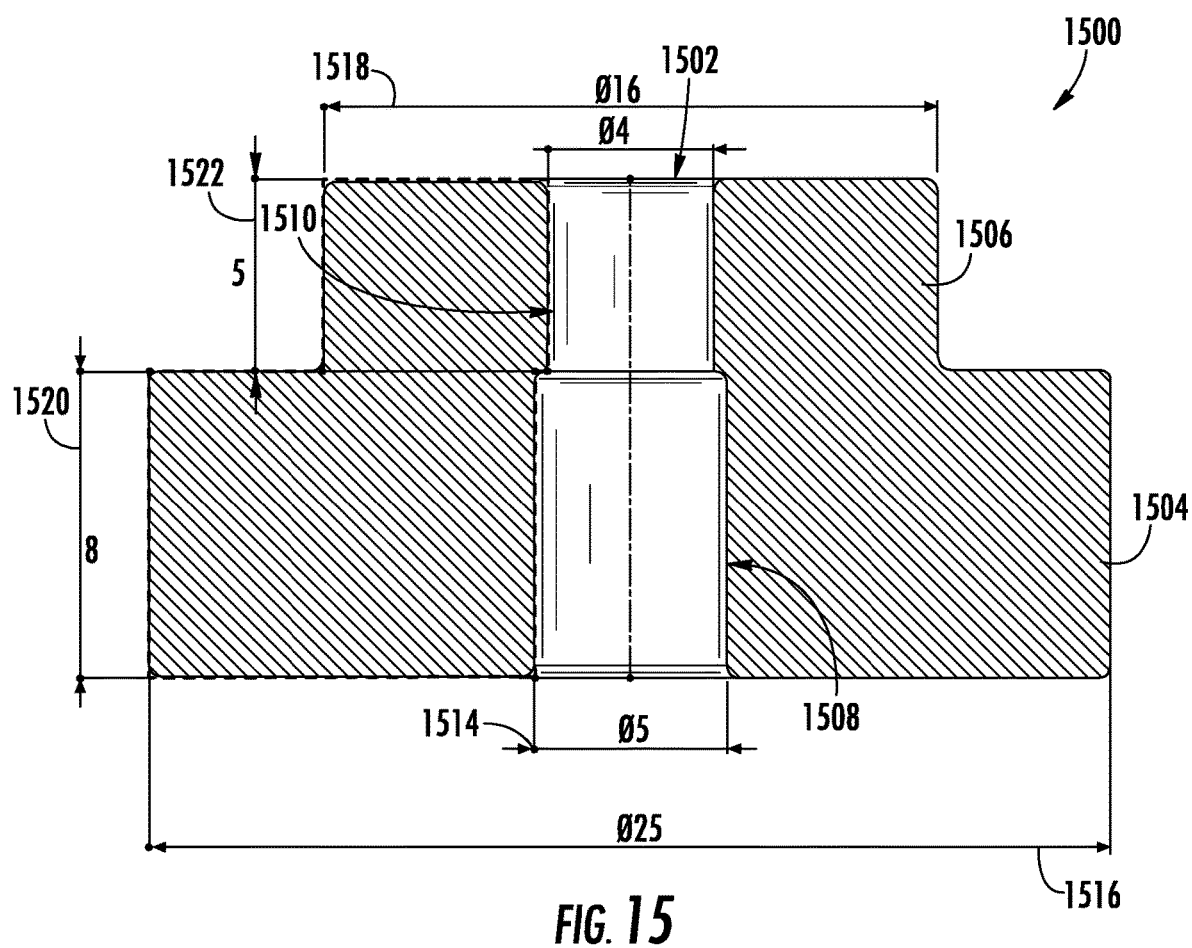
FIG. 15 shows a cross-sectional view of a cylindrical transmitter shadow box that is capable of being used with, for example, the docking station of FIG. 1B, consistent with embodiments of the present disclosure.

FIG. 15 shows a cross-sectional view of a cylindrical transmitter shadow box 1500, which may be configured to be used with, for example, the docking station 100 of FIG. 1B. The transmitter shadow box 1500 includes a cylindrical transmitter compartment 1502, wherein at least a portion of the cylindrical compartment 1502 is configured to receive a respective emitter (e.g., one of the first, second, and third optical emitters 502, 504, and 506). In some instances, a plurality of cylindrical transmitter shadow boxes 1500 may be included within a transmitter shadow box housing.

As shown, the cylindrical transmitter shadow box 1500 includes a first cylindrical portion 1504 and a second cylindrical portion 1506 extending from the first cylindrical portion 1504, wherein the second cylindrical portion 1506 has a diameter that measures than a diameter the first cylindrical portion 1504. As shown, the first and second cylindrical portion 1504 and 1506 may be concentrically arranged.

As also shown, the cylindrical compartment 1502 may define a first cavity 1508 and a second cavity 1510. The first cavity 1508 may be defined in the first cylindrical portion 1504 and may be configured to receive a respective emitter (e.g., one of the first, second, and third optical emitters 502, 504, and 506) and the second cavity 1510 may be defined in the second cylindrical portion 1506 and may have a diameter 1512 that measures less than a diameter 1514 of the first cavity 1508, the diameter 1514 of the first cavity 1508 may correspond to a diameter of the emitter received therein. The second cavity 1510 can be configured to at least partially collimate light generated by the emitter.

As shown, the diameter 1514 of the first cavity 1508 may measure about 5 mm and the diameter 1512 of the second cavity 1510 may measure about 4 mm. As also shown, a first cylindrical portion diameter 1516 may measure about 25 mm, a second cylindrical portion diameter 1518 may measure about 16 mm, a first cylindrical portion height 1520 may measure about 8 mm, and a second cylindrical portion height 1522 may measure about 5 mm.

Figure 16:
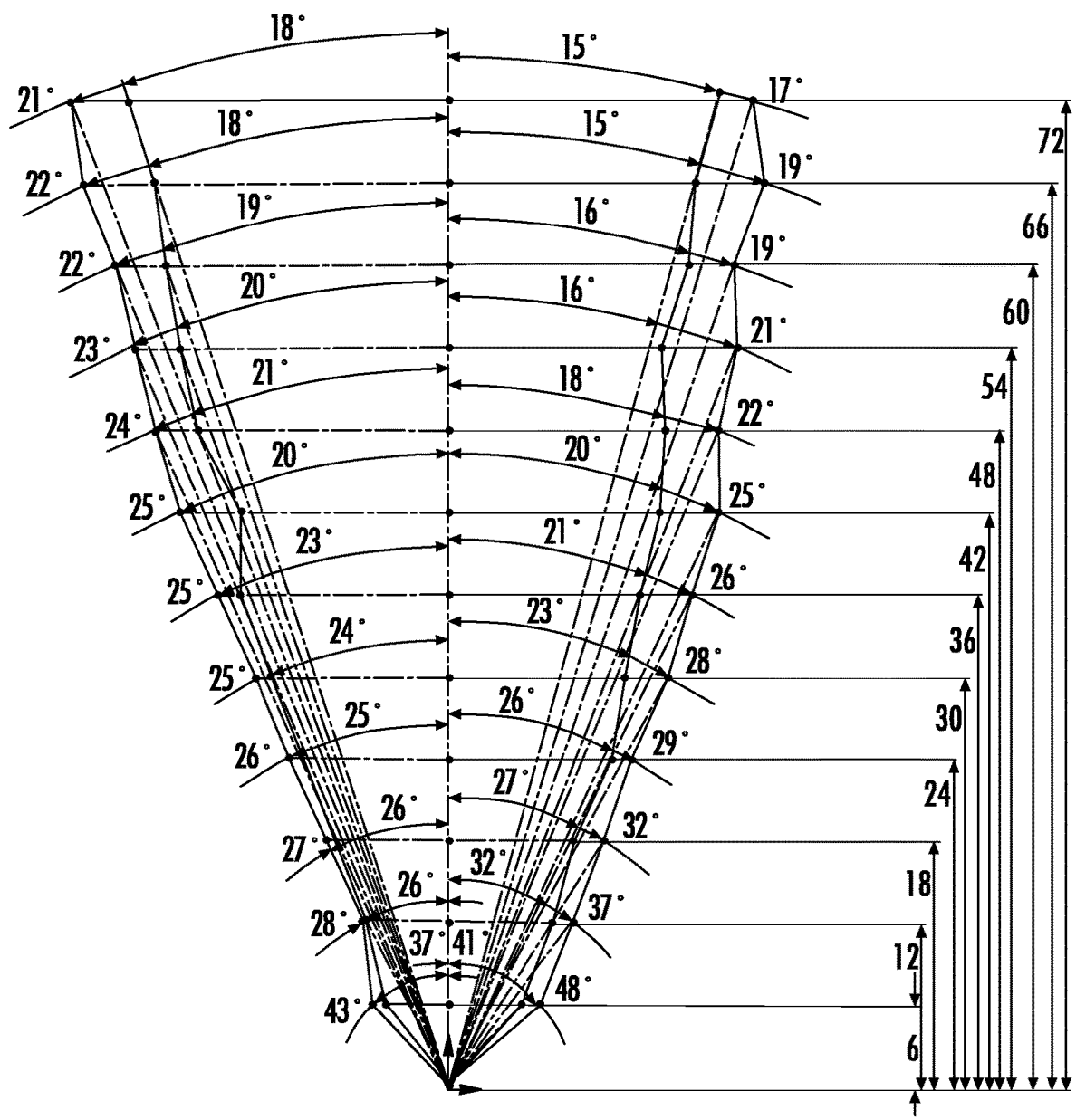
FIG. 16 shows an example of a field of emission for the transmitter shadow box of FIG. 15, consistent with embodiments of the present disclosure.

FIG. 16 shows an example of a field of emission (or a light spread) for an emitter disposed within the transmitter shadow box 1500 when the transmitter shadow box 1500 is formed from Polyoxymethylene (as offered for sale by DuPont under the tradename DELRIN). The spread is shown for a range extending up to 182.88 cm.

Figure 17:
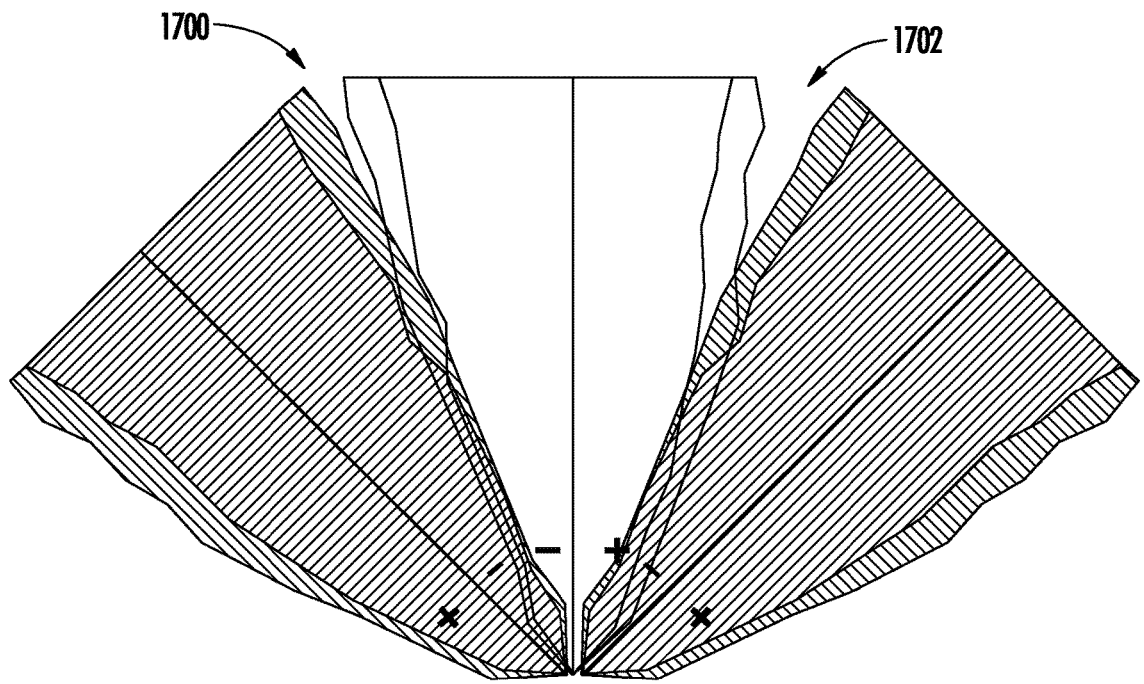
FIG. 17 shows an example of fields of emission for three emitters, each disposed within a respective transmitter shadow box of FIG. 15, consistent with embodiments of the present disclosure.
Figure 18:
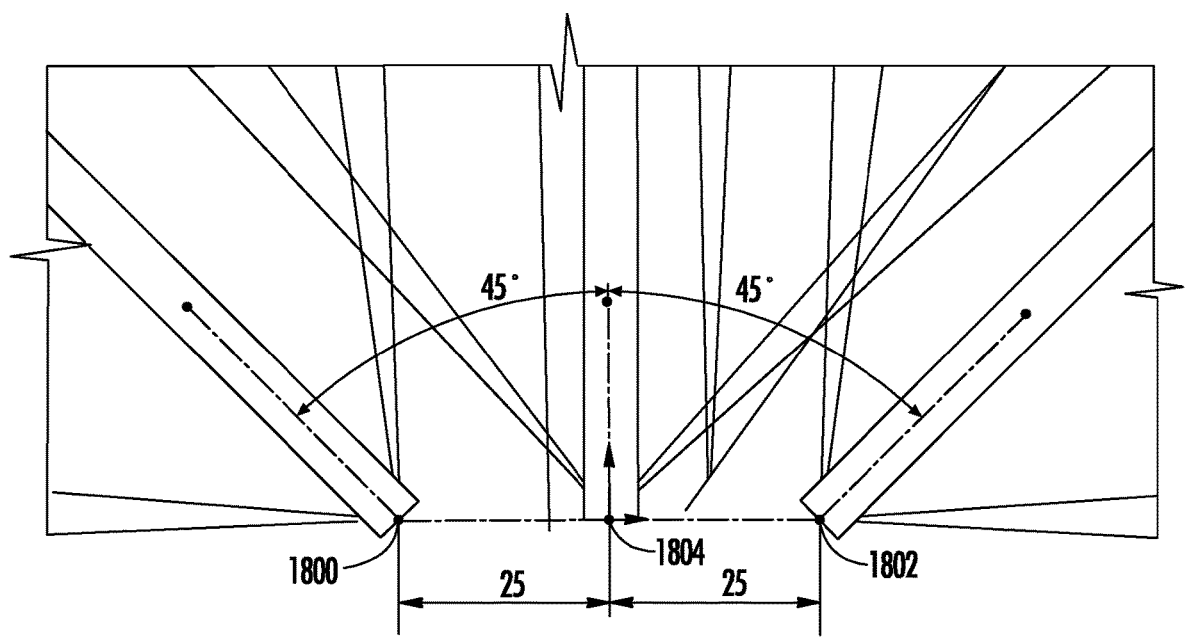
FIG. 18 shows an orientation of the emitters of FIG. 17, consistent with embodiments of the present disclosure.

FIG. 17 shows an example of fields of emission for three emitters, each disposed within a respective transmitter shadow box 1500 in an orientation corresponding to that shown in FIG. 18. As shown in FIG. 18, each of the emitters 1800, 1802, and 1804 are spaced apart from each other and the first and second emitters 1800 and 1802 may be angled relative to the third emitter 1804. For example, the first, second, and third emitters 1800, 1802, and 1804 may be spaced apart from each other by about 25 mm and are oriented such that adjacent emitters are angled relative to each other by about 45°. As shown in FIG. 17, such a configuration may result gaps 1700 and/or 1702 between the emission field of the third emitter 1804 and respective emission fields of the first and second emitters 1800 and 1802.

Figure 19:
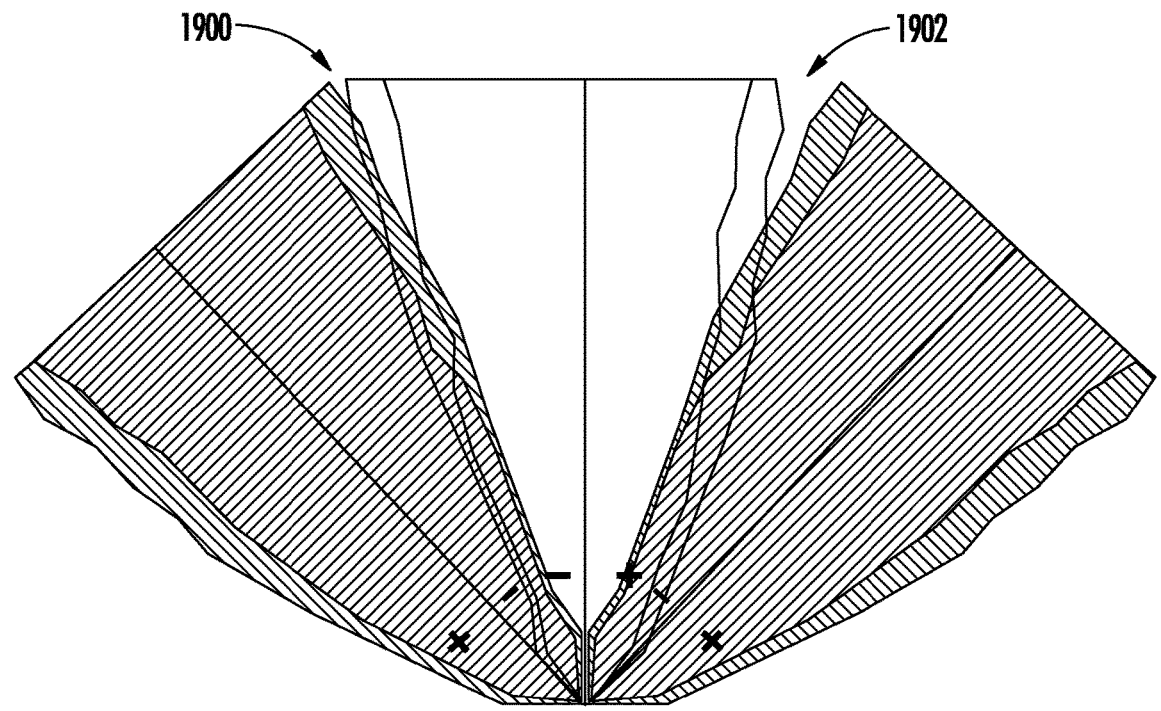
FIG. 19 shows an example of fields of emission for three emitters, each disposed within a respective transmitter shadow box of FIG. 15, consistent with embodiments of the present disclosure.
Figure 20:
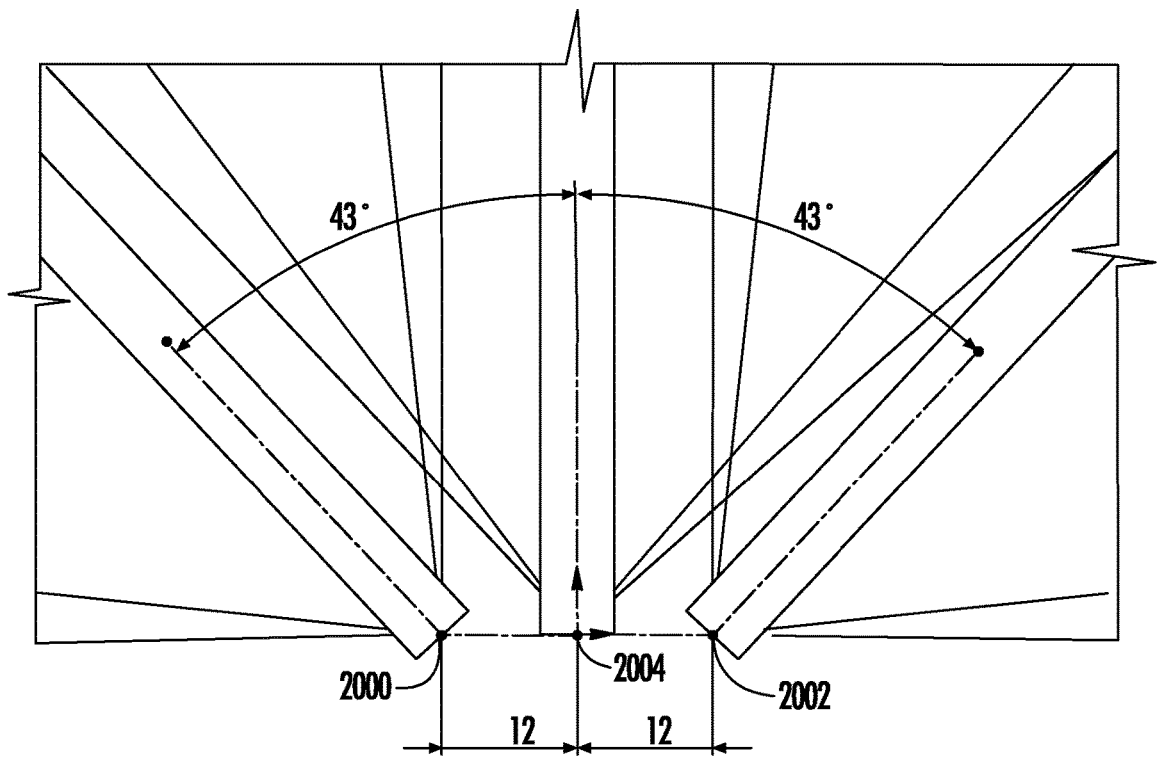
FIG. 20 shows an orientation of the emitters of FIG. 19, consistent with embodiments of the present disclosure.

FIG. 19 shows an example of fields of emission for three emitters, each disposed within a respective transmitter shadow box 1500 in an orientation corresponding to that shown in FIG. 20. As shown, in FIG. 20 each of the emitters 2000, 2002, and 2004 are spaced apart from each other and the first and second emitters 2000 and 2002 may be angled relative to the third emitter 2004. For example, the first, second, and third emitters 2000, 2002, and 2004 may be spaced apart from each other by about 12 mm and are oriented such that adjacent emitters are angled relative to each other by about 43°. As shown in FIG. 19, such a configuration may result in overlap regions 1900 and/or 1902 between the emission field of the third emitter 2004 and respective emission fields of the first and second emitters 2000 and 2002.

Figure 21:
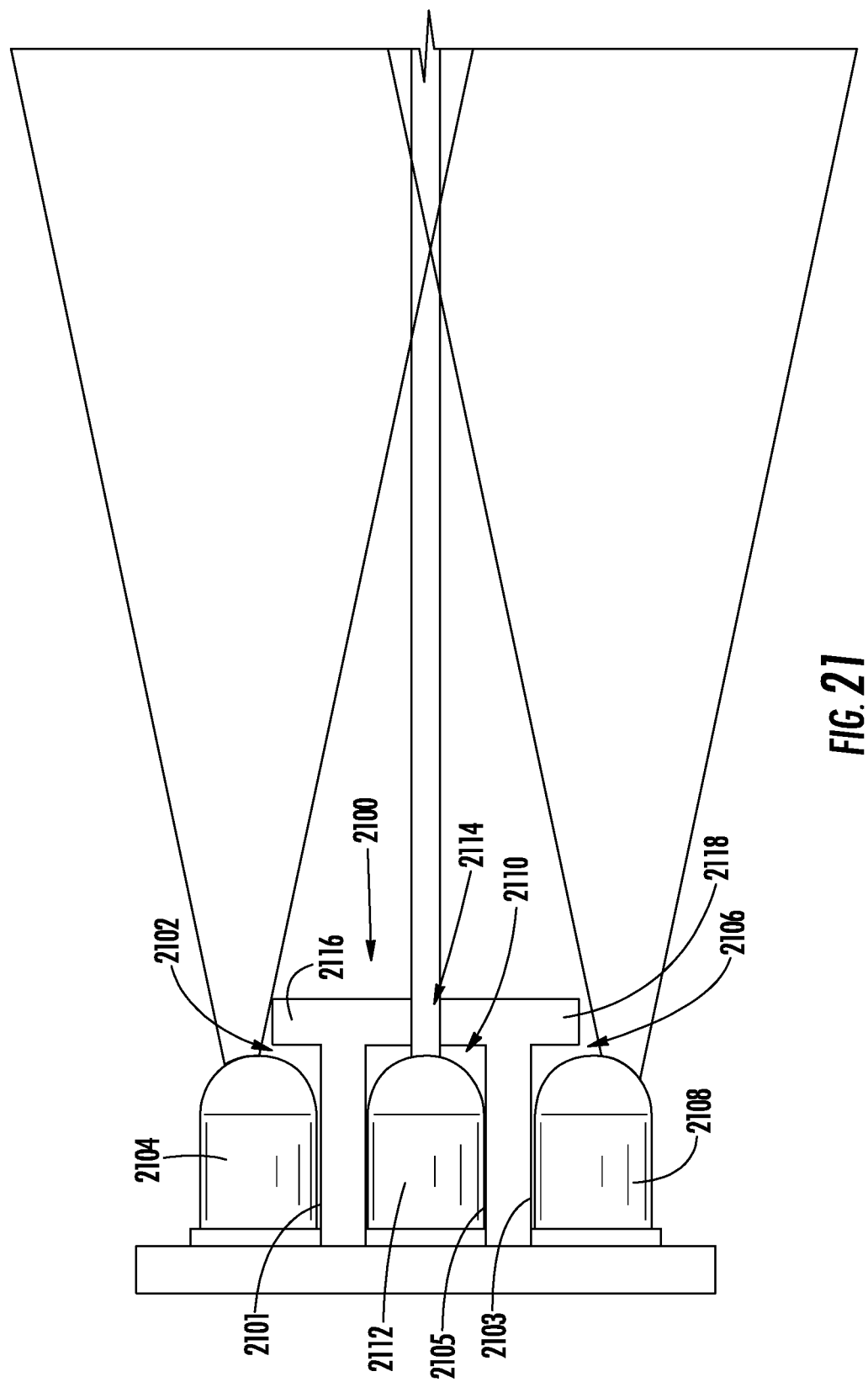
FIG. 21 shows a schematic example of a transmitter shadow box housing capable of being used with, for example, the docking station of FIG. 1C, consistent with embodiments of the present disclosure.

FIG. 21 shows a schematic example of a transmitter shadow box housing 2100 capable of being used with, for example, the docking station 134 of FIG. 1C. As shown, the transmitter shadow box housing 2100 includes a first shadow box 2101 that defines a first transmitter compartment 2102 having a first optical emitter 2104, a second shadow box 2103 that defines a second transmitter compartment 2106 having a second optical emitter 2108, and a third shadow box 2105 that defines a third transmitter compartment 2110 having a third optical emitter 2112, wherein the third optical emitter 2112 is disposed between the first and second optical emitters 2104. In some instances, the first, second, and third optical emitters 2104, 2108, and 2112 may be arranged along a common horizontal plane (e.g., a plane that is generally parallel to a surface to be cleaned).

As shown, the third compartment 2110 substantially encloses the third optical emitter 2112 such that light emitted from the third optical emitter 2112 passes through an aperture 2114 defined in the third compartment 2110. As such, light emitted from the third compartment 2110 can generally be described as being collimated. The aperture 2114 can have a circular, rectangular, square, and/or any other shape. As such, the shape of the aperture can be configured such that the aperture 2114 occludes at least one side of the third optical emitter 2112. For example, the shape of the aperture 2114 can be configured such that the aperture 2114 only occludes two sides (e.g., the left and right or top and bottom) sides of the third optical emitter 2112. Occlusion of the top and bottom sides of the third optical emitter 2112 may determine, at least in part, the detection distances of the third optical emitter 2112 and occlusion of the left and right sides of the third optical emitter may determine, at least in part, a width of the emitted signal of the third optical emitter 2112.

As also shown, the first and second compartments 2102 and 2106 are defined, at least in part, by first and second shields 2116 and 2118, respectively, that extend in a direction away from the third compartment 2110. The first and second shields 2116 and 2118 occlude a portion of the first and second optical emitters 2104 and 2108 such that light emitted by the first and second optical emitters 2104 and 2108 can have a desired shape (e.g., to control an amount of overlap between emissions generated by the first, second, and/or third emitters 2104, 2108, and/or 2112). In some instances, a side of the first and second compartment 2102 and 2106 opposite the first and second shields 2116 and 2118 can be open. The first and second shields 2116 and 2118 can be configured to occlude one or more sides of the first and second optical emitters 2104 and 2108. For example, the first and second shields 2116 and 2118 can be configured to occlude only two sides (e.g., the left and right or top and bottom sides) of the first and second optical emitters 2104 and 2108, respectively. Occlusion of the top and bottom sides of the first and second optical emitters 2104 and 2108 may determine, at least in part, the detection distances of the first and second optical emitters 2104 and 2108 and occlusion of the left and right sides of the first and second optical emitters may determine, at least in part, a width of the emitted signals of the first and second optical emitters 2104 and 2108.

Figure 22:
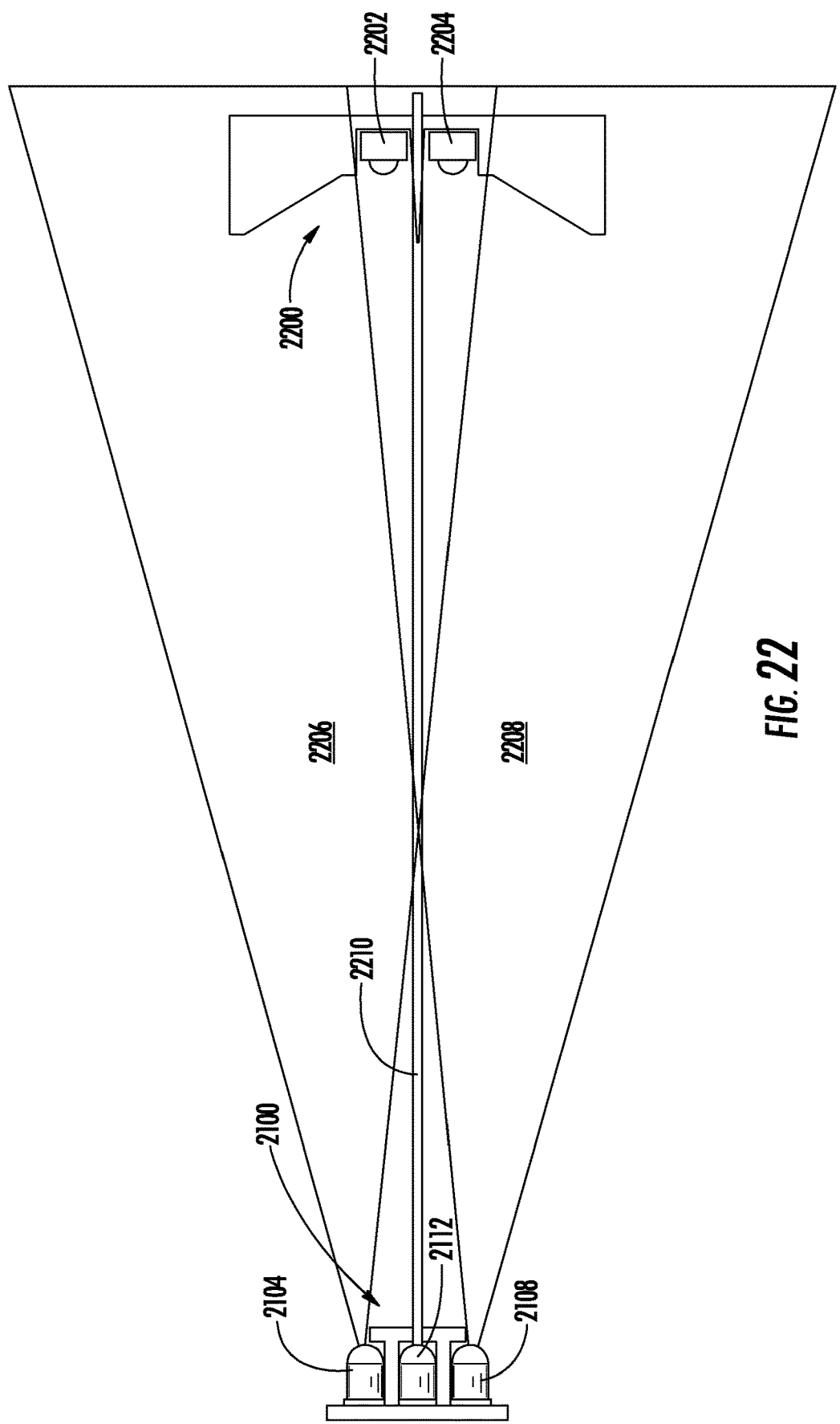
FIG. 22 shows a schematic example of the transmitter shadow box housing of FIG. 21 and a schematic example of a receiver shadow box housing configured to be coupled to, for example, a robotic cleaner, consistent with embodiments of the present disclosure.

FIG. 22 shows a schematic example of the transmitter shadow box housing 2100 of FIG. 21 and a schematic example of a receiver shadow box housing 2200 configured to be coupled to, for example, a robotic cleaner. As shown, the receiver shadow box housing 2200 includes a first and second optical receiver 2202 and 2204 configured to receive one or more of a first, second, and/or third optical signal 2206, 2208, and/or 2210 generated by the first, second, and/or third optical emitters 2104, 2108, and 2112, respectively.

As shown, when the receiver shadow box housing 2200 is aligned with the transmitter shadow box housing 2100, the third optical signal 2210 can be detected by each of the first and second optical receivers 2202 and 2204. In other words, when the first and second optical receivers 2202 and 2204 both detect the third optical signal 2210, a robotic cleaner can engage a docking station with a proper alignment by maintaining detection of (e.g., following) the third optical signal 2210. As such, when the third optical signal 2210 is detected, the robotic cleaner does not need to determine whether the first and second optical signals 2206 and 2208 are detected.

Figure 23:
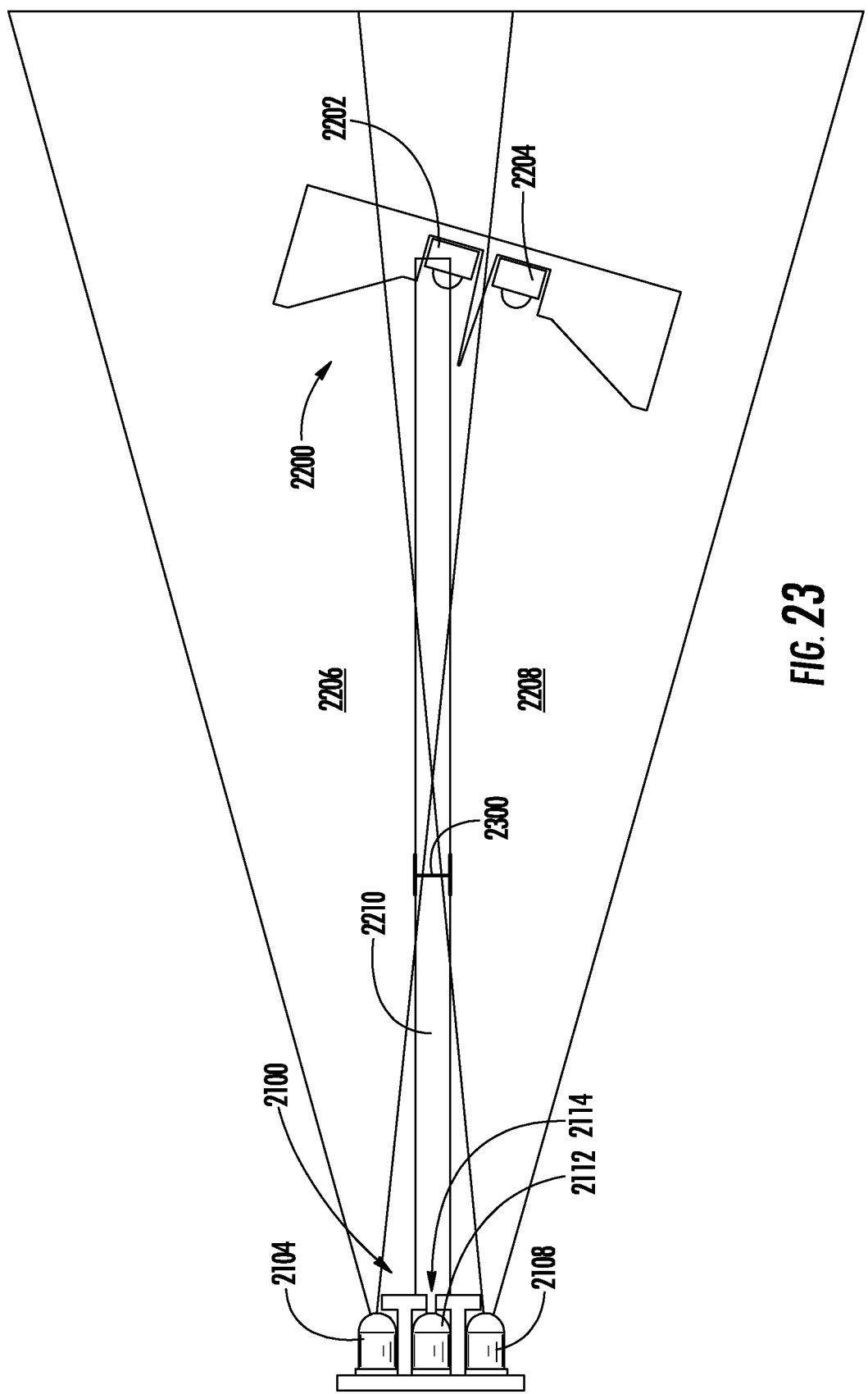
FIG. 23 shows a schematic example of the transmitter shadow box housing of FIG. 21 and a schematic example of the receiver box of FIG. 22 in a misaligned condition, consistent with embodiments of the present disclosure.

FIG. 23 shows a schematic example of the transmitter shadow box housing 2100 of FIG. 21 and a schematic example of the receiver shadow box housing 2200 of FIG. 22 in a misaligned condition. As shown, when misaligned, only one of the optical receivers 2202 and 2204 may detect the third optical signal 2210. In this instance, for example, a robotic cleaner having the receiver shadow box housing 2200 coupled thereto may move in a direction such that the other of the optical receivers 2202 or 2204 detects the third optical signal. When the other of the optical receiver 2202 or 2204 detects the third optical signal 2210, the robotic cleaner may move to an orientation in an attempt to achieve or maintain detection of the third optical signal 2210 by both of the optical receivers 2202 and 2204. As such, the robotic cleaner may cause the receiver shadow box housing 2200 to oscillate about the third optical signal 2210 at least until the robotic cleaner engages the docking station and/or a desired orientation (e.g., aligned with a central axis of the third optical signal 2210) is obtained. As a width 2300 of the third optical signal 2210 is increased (e.g., by increasing the size of the aperture 2114), it may become easier for the robotic cleaner to obtain an orientation wherein both optical receivers 2202 and 2204 simultaneously detect the third optical signal 2210. However, as the width 2300 is increased, the alignment of the robotic cleaner relative to the docking station may decrease when the robotic cleaner engages (e.g., contacts) the docking station.

Figure 24:
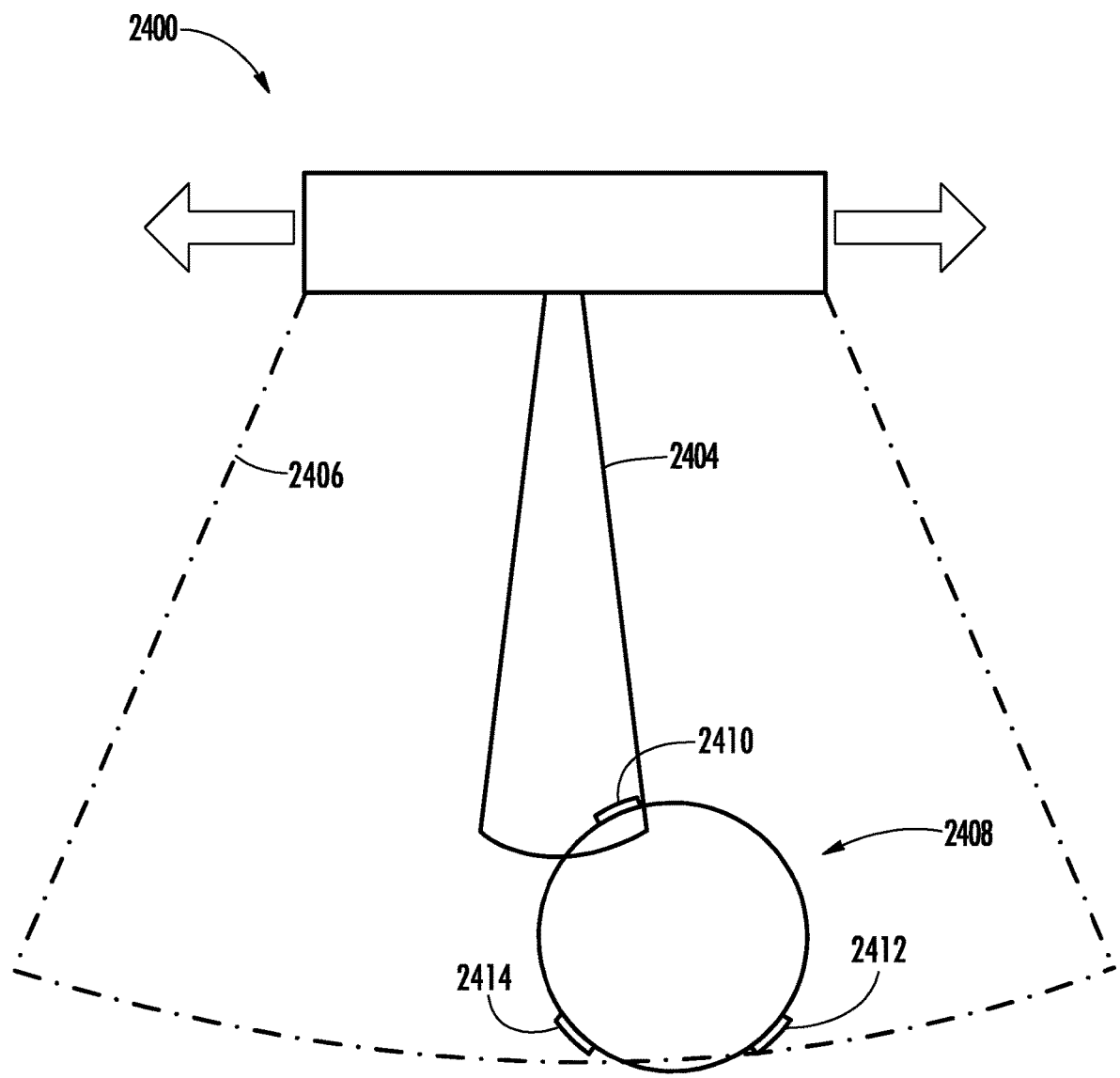
FIG. 24 shows a schematic example of a docking station configured to emit a single docking signal, consistent with embodiments of the present disclosure.

FIG. 24 shows a schematic example of a docking station 2400, which may be an example of the docking station 10 of FIG. 1A. The docking station 2400 is configured to emit a single docking signal 2404 and at least one proximity signal 2406. A robotic cleaner 2408 having a forward signal receiver 2410 and first and second rearward signal receivers 2412 and 2414 is configured to follow the docking signal 2404 until the robotic cleaner 2408 engages the docking station 2400. When following the docking signal 2404 the robotic cleaner 2408 may approach the docking station 2400 in a misaligned orientation (e.g., an orientation relative to the docking station 2400, wherein the robotic cleaner 2408 would not electrically couple to the docking station 2400). In these instances, the docking station 2400 can be configured to move (e.g., pivot or slide) in response to the robotic cleaner 2408 engaging the docking station 2400. The movement of the docking station 2400 can be configured to correct for the misalignment of the robotic cleaner 2408 relative to the docking station 2400.

The rearward receivers 2412 and 2414 may be used to determine a pose of the robotic cleaner 2408. For example, a determination of a pose of the robotic cleaner 2408 may be based on whether one or both of the rearward receivers 2412 and 2414 are detecting the proximity signal 2406.

Figure 25:
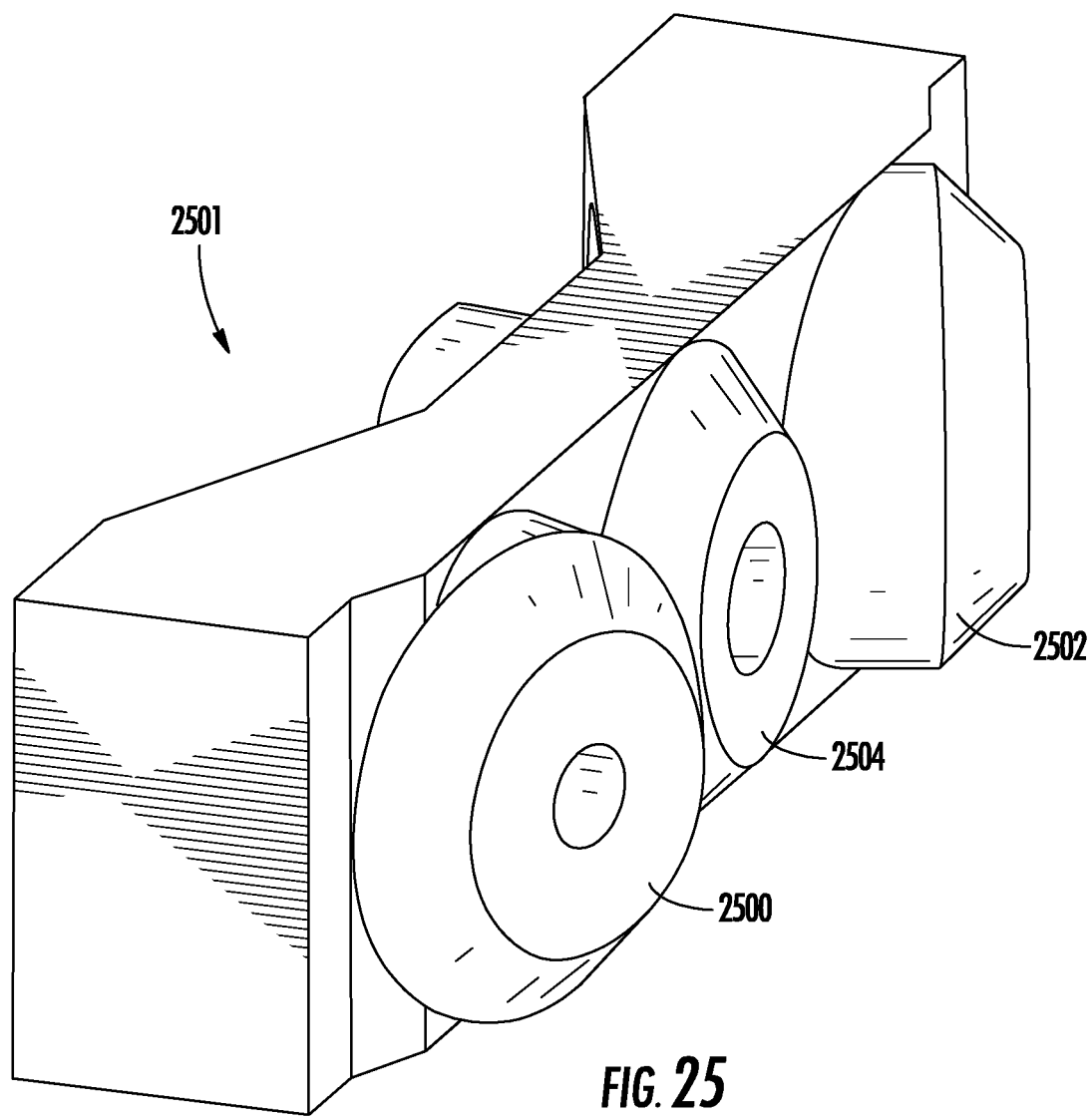
FIG. 25 shows a perspective view of a transmitter shadow box housing having first, second, and third transmitter shadow boxes, consistent with embodiments of the present disclosure.

FIG. 25 shows a perspective view of a shadow box housing 2501 having first, second, and third transmitter shadow boxes 2500, 2502, and 2504, which may be configured to be used with, for example, the docking station 100 of FIG. 1B. As shown, each of the transmitter shadow boxes 2500, 2502, and 2504 are disposed (or defined) within the shadow box housing 2501 such that the third transmitter shadow box 2504 is disposed between the first and second shadow boxes 2500 and 2502. In other words, the transmitter shadow boxes 2500, 2502, and 2504 can generally be described as being defined within a housing coupled to or formed from a robotic cleaner. Each of the transmitter shadow boxes 2500, 2502, and 2504 is configured to receive a respective optical emitter, each optical emitter being configured to emit a different optical signal.

Figure 26:
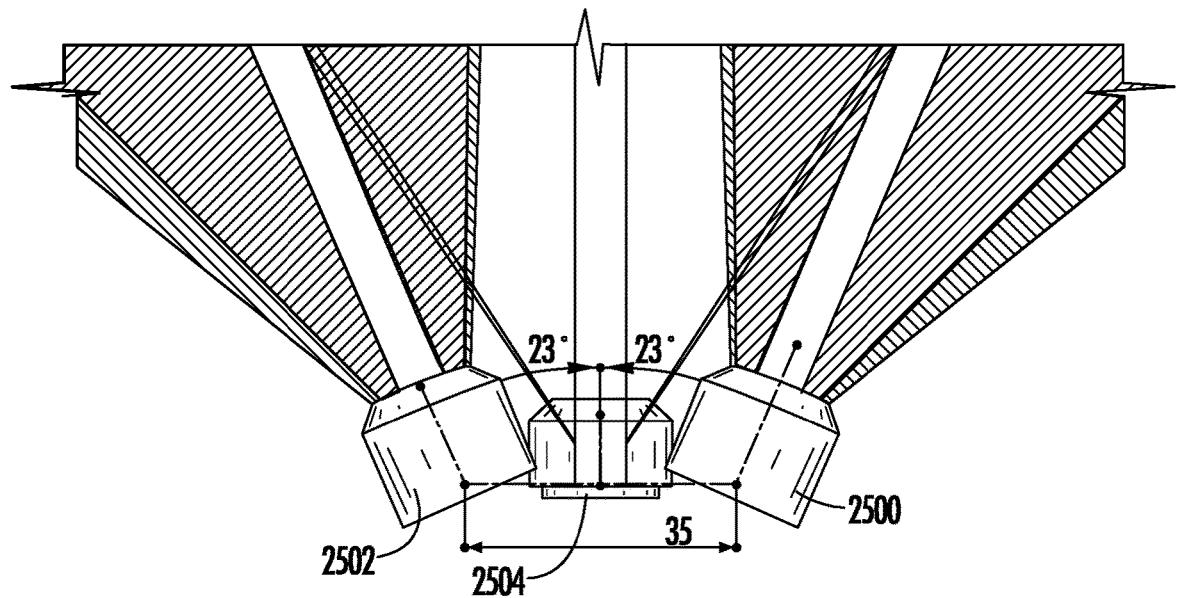
FIG. 26 shows a top view of an example arrangement of the first, second, and third transmitter shadow boxes of FIG. 25, consistent with embodiments of the present disclosure.
Figure 27:
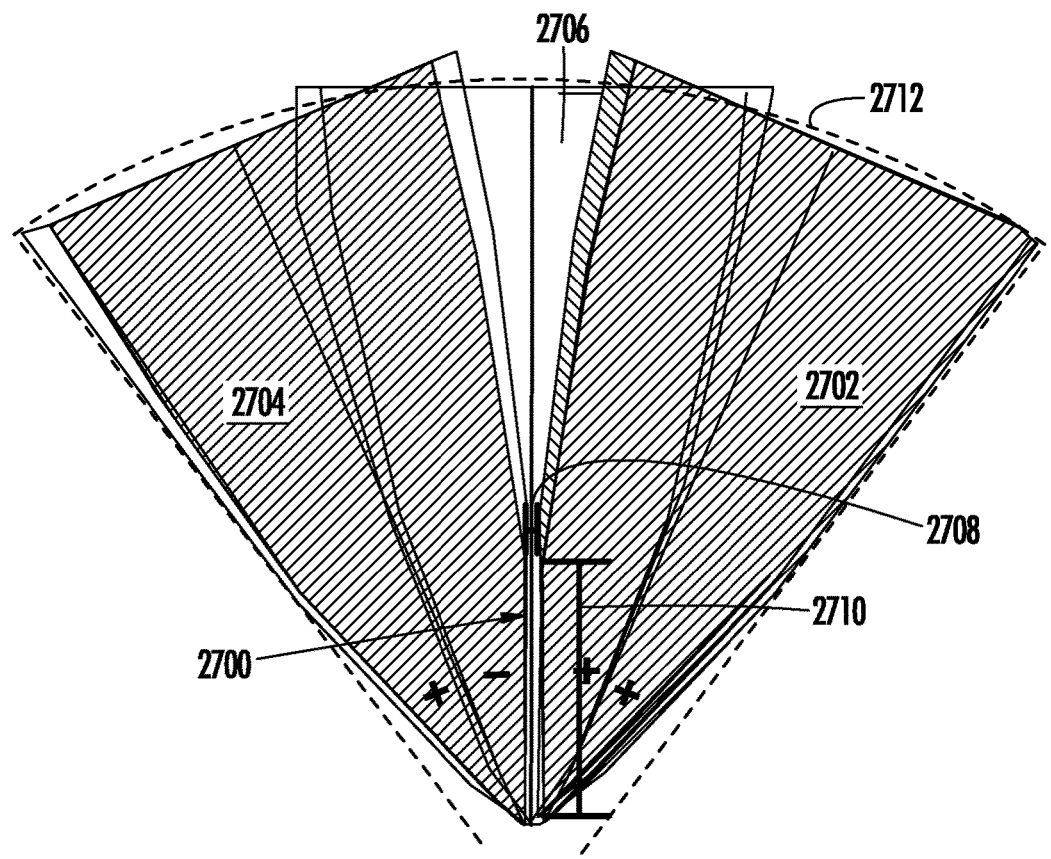
FIG. 27 shows an example of fields of emission for the shadow box housing of FIG. 26, consistent with embodiments of the present disclosure.

As shown in FIG. 26, the first and second transmitter shadow boxes 2500 and 2502 can be spaced apart from each other and angled relative to the third transmitter shadow box 2504. For example, and as shown, the first and second shadow boxes 2500 and 2502 can be positioned such that the optical emitters corresponding to the first and second shadow boxes 2500 and 2502 are spaced apart from each other by about 35 mm and angled relative to the optical emitter corresponding to the third shadow box 2504 by about 23°. FIG. 27 shows an example of fields of emission for three emitters, each disposed within respective ones of transmitter shadow boxes 2500, 2502, and 2504 in an orientation corresponding to that shown in FIG. 26.

As shown in FIG. 27, a channel 2700 may extend between a first field of emission 2702 corresponding to the first optical emitter and a second field of emission 2704 corresponding to the second optical emitter. The channel 2700 may correspond to a portion of a third field of emission 2706 corresponding to the third optical emitter, wherein the signal emitted by the third optical emitter can be detected in the absence of the signals emitted by the first and second optical emitters. A width 2708 of the channel 2700 may be substantially constant for a majority of a length 2710 of the channel 2700. As shown, the channel 2700 may only extend for a portion of a length of a detection zone 2712.

Figure 28:
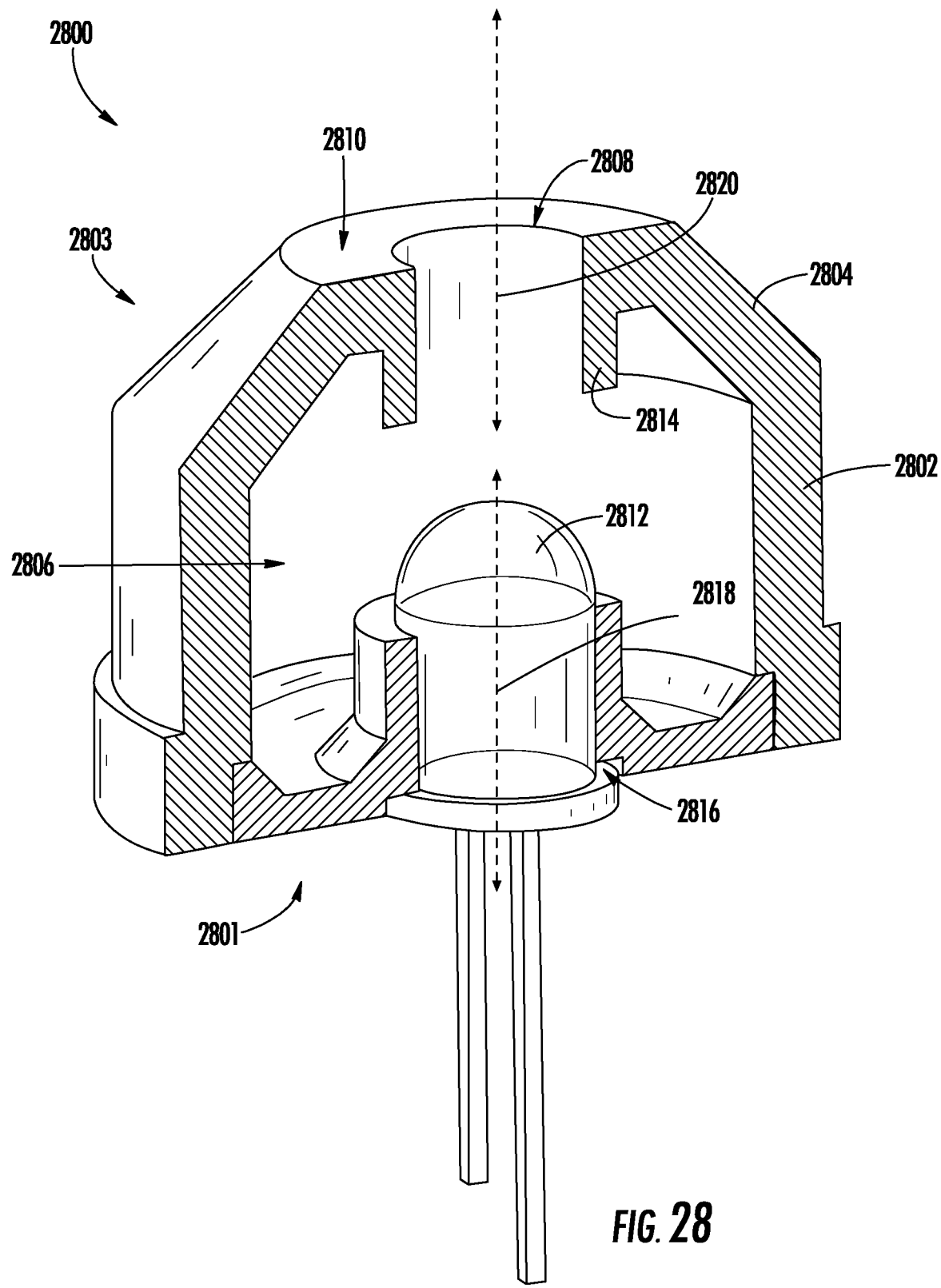
FIG. 28 shows a cross-sectional perspective view of a transmitter shadow box, which may be an example of the first, second, and/or third transmitter shadow boxes of FIG. 25, consistent with embodiments of the present disclosure.

FIG. 28 shows a cross-sectional perspective view of an example of a transmitter shadow box 2800, which may be an example of one or more of the first, second, or third transmitter shadow boxes 2500, 2502, and 2504. As shown, the transmitter shadow box 2800 includes a base portion 2801 and a collimating portion 2803. The collimating portion 2803 includes cylindrical portion 2802 and a frustoconical portion 2804 extending around the cylindrical portion 2802. A cavity 2806 is defined within collimating portion 2803 that has a shape that generally corresponds to that of the cylindrical portion 2802 and the frustoconical portion 2804 of the collimating portion 2803. An aperture 2808 extends from an outer surface 2810 of the frustoconical portion 2804 and into the cavity 2806. For example, the aperture 2808 may extend from a top planar surface of the frustoconical portion 2804 and into the cavity 2806. In some instances, the aperture 2808 can be a circular aperture, wherein the aperture 2808 is concentric with an optical emitter 2812. In these instances, a cylindrical collimator 2814 may extend from the aperture 2808 in a direction of the optical emitter 2812.

As shown, the base portion 2801 and the collimating portion 2803 are configured to couple to each other. In some instances, the transmitter shadow box 2800 can be formed from a single monolithic piece.

As also shown, the base portion 2801 is configured to receive the optical emitter 2812. For example, the base portion 2801 can define a receptacle 2816 for receiving at least a portion of the optical emitter 2812 and that is configured to align the optical emitter 2812 relative to, for example, the aperture 2808. In some instances, the receptacle 2816 is configured to align a central axis 2818 of the optical emitter 2812 with a central axis 2820 of the aperture 2808. For example, the receptacle 2816 can be configured align the optical emitter 2812 such that the optical emitter 2812 is concentric with aperture 2808. The alignment of the optical emitter 2812 may influence a shape and/or size of a field of emission of the optical emitter 2812.

Figure 29:
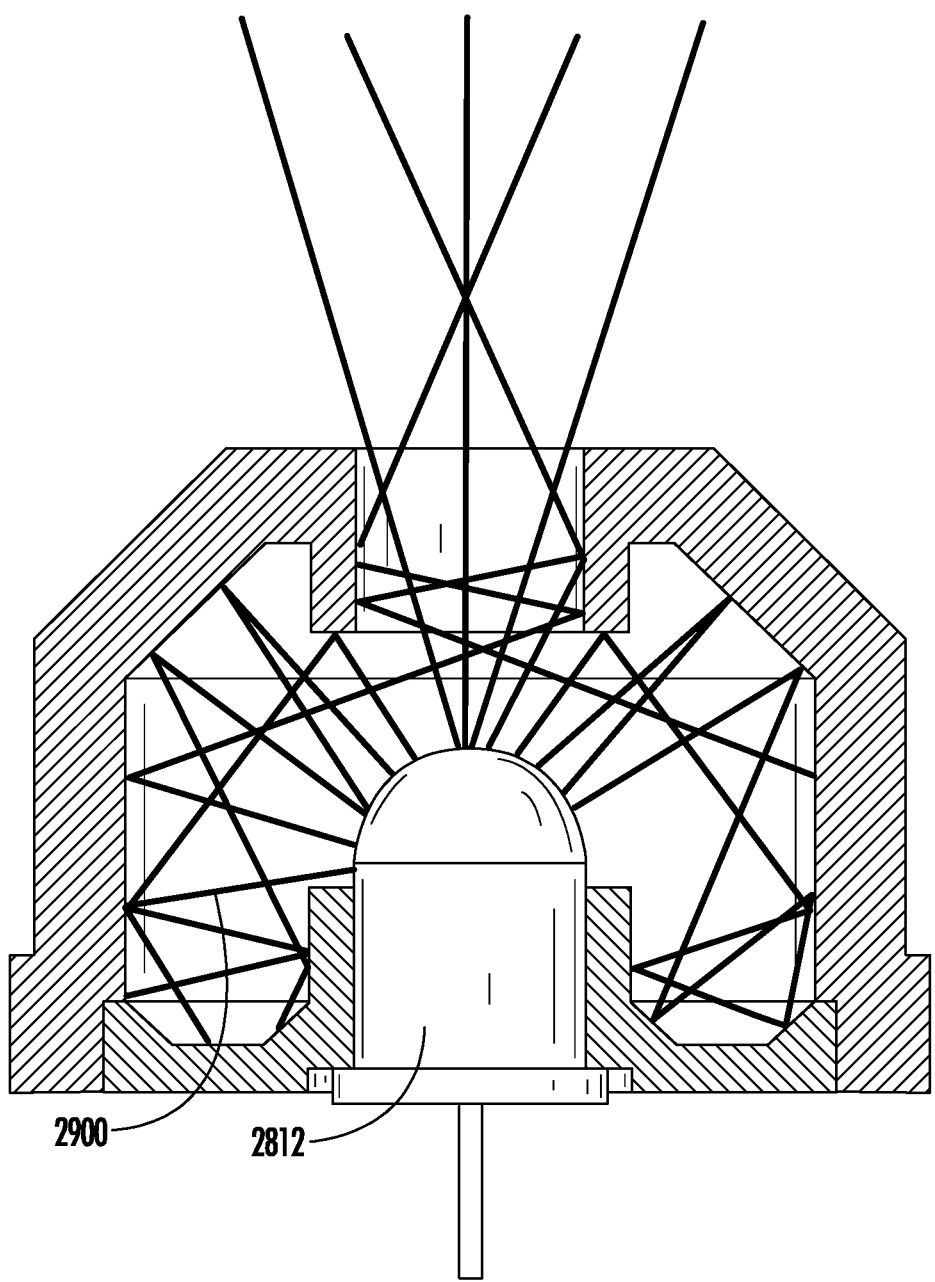
FIG. 29 shows a cross-sectional side view of the of the transmitter shadow box of FIG. 28, consistent with embodiments of the present disclosure.

FIG. 29 shows a cross-section view of the transmitter shadow box 2800 showing example reflection patterns for an optical emission 2900 generated by the optical emitter 2812.

Figure 30:
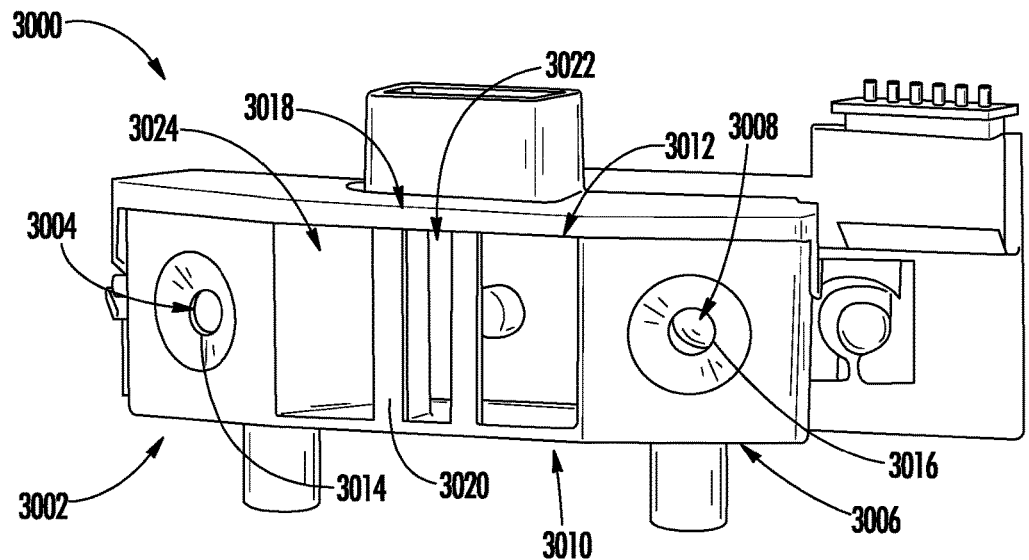
FIG. 30 is a perspective view of a transmitter shadow box housing, consistent with embodiments of the present disclosure.

FIG. 30 shows a perspective view of an example of a transmitter shadow box housing 3000 that includes a first transmitter shadow box 3002 that defines a first transmitter compartment 3004, a second transmitter shadow box 3006 that defines a second transmitter compartment 3008, and a third transmitter shadow box 3010 that defines a third transmitter compartment 3012. The third shadow box 3010 is disposed between the first and second shadow boxes 3002 and 3006. The first and second shadow boxes 3002 and 3006 include respective output apertures 3014 and 3016 through which light within a respective compartment 3004 or 3006 can be emitted. The output apertures 3014 and 3016 include at least one dimension that measures less than a corresponding dimension of a respective compartment 3004 or 3006. As such, the output apertures 3014 and 3016 can generally be described as being configured to shape light emitted therefrom.

As shown, the third shadow box 3010 includes an optical shaper 3018. The optical shaper 3018 is configured to shape the light such that at least two illumination regions are formed using light emitted from the third compartment 3012. Each illumination region may have, for example, a different intensity, such that only one illumination region may be detected by a robotic cleaner at a predetermined distance away from the transmitter shadow box housing 3000.

The optical shaper 3018 can include one or more optical barriers 3020. For example, the optical shaper 3018 can include a plurality of optical barriers 3020 that define an optical shaping channel 3022 and a plurality of optical dispersion channels 3024 on opposing sides of the optical shaping channel 3022. The optical dispersion channels 3024 can be generally described as being configured to increase a width of the optical signal at a location proximate the optical shadow box housing 3000 (when compared to a width of the light emitted from the optical shaping channel 3022 at a location proximate the shadow box housing 3000). The optical dispersion channel 3024 can be configured such that light emitted therefrom has an intensity that measures less than an intensity of a light emitted from the optical shaping channel 3022. As such, the light emitted from the optical dispersion channel 3024 can be configured such that it is only detected by a robotic cleaner for a portion of the detection distance of the light emitted from the optical shaping channel 3022. In other words, the optical shaper 3018 can be configured to increase the spread of detectable light emitted from the third shadow box 3010 at a location proximate the shadow box housing 3000. The increase in detectable light may be used, for example, by a robotic cleaner to determine that it is proximate to a docking station. For example, in some instances, the detectable light emitted from the third shadow box 3010, proximate the shadow box housing 3000 and/or the docking station, may extend up to 180° around the shadow box housing 3000 and/or the docking station.

Figure 31:
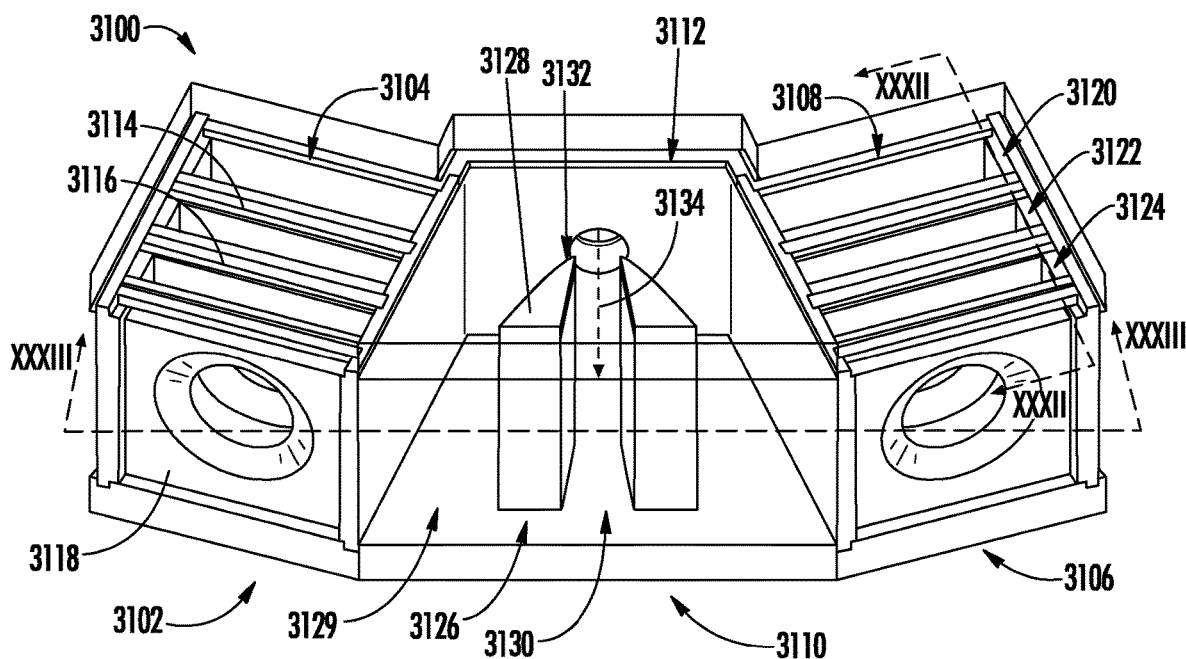
FIG. 31 is a perspective view of a transmitter shadow box housing, which may be an example of the transmitter shadow box housing of FIG. 30, consistent with embodiments of the present disclosure.

FIG. 31 shows a top perspective view of a shadow box housing 3100, which may be an example of the transmitter shadow box housing 3000 of FIG. 30. A portion of the shadow box housing 3100 is shown as transparent for purposes of clarity. As shown, the shadow box housing 3100 includes a first transmitter shadow box 3102 defining a first transmitter compartment 3104, a second transmitter shadow box 3106 defining a second transmitter compartment 3108, and a third transmitter shadow box 3110 defining a third transmitter compartment 3112. The first and second compartments 3104 and 3108 each include a first, second, and third divider 3114, 3116, and 3118. The first, second, and third dividers 3114, 3116, and 3118 are configured such that light can pass through a portion of each of the dividers 3114, 3116, and 3118. As such, the first, second, and third dividers 3114, 3116, and 3118 can be configured to shape light passing therethrough to have, for example, a predetermined size and/or shape when emitted from a respective shadow-box 3102 or 3106.

The dividers 3114, 3116, and 3118 define first, second, and third dispersion regions 3120, 3122, and 3124. The dispersion regions 3120, 3122, and 3124 are configured to reflect light not passing through a respective divider 3114, 3116, and 3118 within a respective dispersion region 3120, 3122, or 3124. The reflection of the light within a respective dispersion region 3120, 3122, or 3124 reduces the intensity of the light such that a substantial portion of the light emitted from a respective shadow box 3102 or 3106 generally conforms to a shape defined by the portions of the dividers 3114, 3116, and 3118 through which light can pass.

As shown, the third compartment 3112 includes an optical shaper 3126. The optical shaper 3126 can include one or more optical barriers 3128. As shown, the optical shaper 3126 includes a plurality of optical barriers 3128 such that an optical shaping channel 3130 is defined between the optical barriers 3128. The optical shaping channel 3130 is configured to shape light emitted from the third compartment 3112. In some instances, the optical shaping channel 3130 can increase in width along an emission direction 3134. A plurality of optical dispersion channels 3129 are disposed on opposing sides of the optical shaping channel 3130. The optical dispersion channels 3129 are configured to reduce an intensity of light emitted therefrom. The optical dispersion channels 3129 are defined, at least in part, by a directing surface 3132 of a respective optical barrier 3128. The directing surface 3132 is configured to cause light incident thereon to be reflected within the third compartment 3112. As the number of reflections increase, the intensity of the light decreases. For example, the directing surface 3132 can include an arcuate surface configured to cause light to be reflected in a direction opposite the emission direction 3134 such that the light reflects off a surface of the third compartment 3112 and at least a portion of the reflected light may be emitted from the third compartment 3112.

Figure 32:
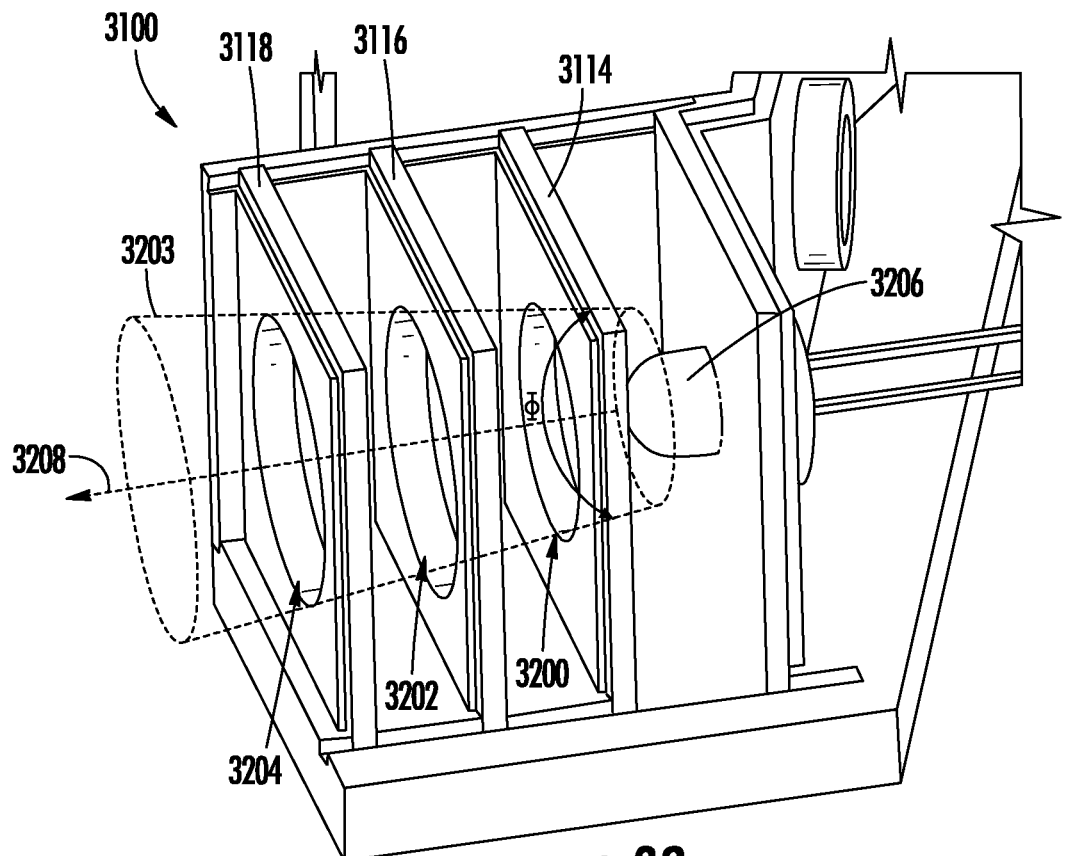
FIG. 32 is a cross-sectional perspective view of the transmitter shadow box housing of FIG. 31 taken along the line XXXII-XXXII, consistent with embodiments of the present disclosure.

FIG. 32 is a perspective cross-sectional view of the shadow box housing 3100 taken along the line XXXII-XXXII of FIG. 31. As shown, the first, second, and third dividers 3114, 3116, and 3118 each include a respective aperture 3200, 3202, and 3204 through which light generated by an optical emitter 3206 (e.g., a light emitting diode) passes. For example, and as shown, the apertures 3200, 3202, and 3204 can each have a circular shape. A measure of a diameter of each aperture 3200, 3202, and 3204 may increase along an emission axis 3208 of the optical emitter 3206 in a direction of emission. In other words, a diameter of the first aperture 3200 may measure less than a diameter of the second aperture 3202 and a diameter of the second aperture 3202 may measure less than a diameter of the third aperture 3204. By including multiple apertures 3200, 3202, and 3204, each having a different diameter, the light emitted from the third aperture 3204 may have an emission cone 3203 of a predetermined shape and/or size. For example, the first, second, and third apertures 3200, 3202, and 3204 can be configured such that the emission cone 3203 has a spread angle ϕ in a range that extends between 0° and 180°. By way of further example, the spread angle ϕ can measure in a range of 15° to 55°. As such, light emitted at least from the first and second shadow boxes 3102 and 3106 may be prevented from overlapping within a detection zone extending around the shadow box housing 3100.

The dividers 3114, 3116, and 3118 can be spaced apart from each other by a spacing distance measuring in a range of, for example, 2 millimeters (mm) to 5 mm. By way of further example, the dividers 3114, 3116, and 3118 can be spaced apart from each by a spacing distance measuring about 3.5 mm.

Figure 33:
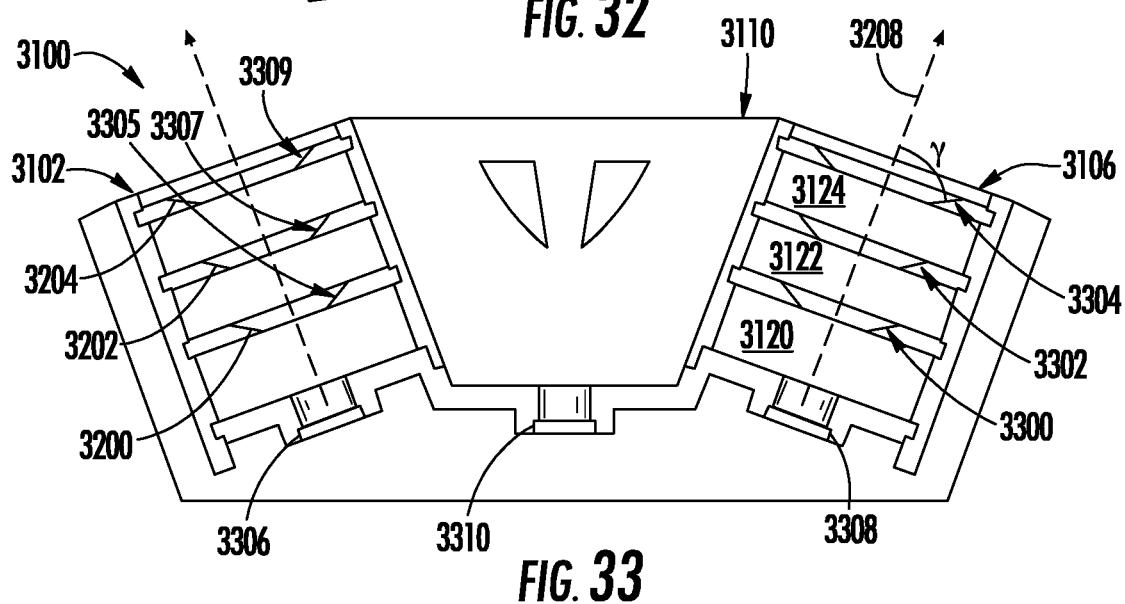
FIG. 33 is a cross-sectional view of the transmitter shadow box housing of FIG. 31 taken along the line XXXIII-XXXIII, consistent with embodiments of the present disclosure.

FIG. 33 shows a cross-sectional top view of the shadow box housing 3100 taken along the line XXXIII-XXXIII of FIG. 31. As shown, each of the apertures 3200, 3202, and 3204 can include a respective tapered region 3300, 3302, and 3304. Each tapered region 3300, 3302, and 3304 tapers in a direction that is opposite the direction of light emission (e.g., such that a diameter of each of the apertures 3200, 3202, and 3204 increases with increasing distance from the optical emitter). The tapered regions 3300, 3302, and 3304 are configured to cause light incident thereon to be reflected within a respective dispersion region 3120, 3122, or 3124, which may reduce the amount of back reflection. The reflection of the light within the dispersions regions 3120, 3122, and 3124 reduces the intensity of the reflected light such that the reflected light is not detected by a robotic cleaner. As such, the detectable portion of the light emitted from a respective one of the shadow boxes 3102 or 3106 corresponds to a predetermined size and/or shape.

In some instances, the surfaces bounding the dispersion regions 3120, 3122, and 3124 may be configured to be reflective (e.g., at least 10%, 20%, 30%, or 40% of light incident thereon is reflected). In other instances, the surfaces bounding the dispersion regions 3120, 3122, and 3124 may be configured to be matte (e.g., less than 10% of light incident thereon is reflected). Use of reflective surfaces, instead of matte surfaces, may allow for greater control over the shape of the light emitted from a respective shadow box 3102 and 3106.

The shadow boxes 3102, 3106, and 3110 are arranged such that light emitted from the first and second shadow boxes 3102 and 3106 is divergent in a direction of light emission from the shadow box housing 3100 and the light emitted from the third shadow box 3110 extends therebetween. As also shown, each of the shadow boxes 3102, 3106, and 3110 defines an optical emitter receptacle 3306, 3308, and 3310. Each optical emitter receptacle 3306, 3308, and 3310 is configured to receive at least a portion of a respective optical emitter.

The shape and/or size of the emission cone 3203 may be based, at least in part, on the smallest diameter of each of the apertures 3200, 3202, and 3204, a taper angle γ measured between the emission axis 3208 and a tapered surface 3305, 3307, and 3309 of the tapered regions 3300, 3302, and 3304 and/or the size of the light emitter (e.g., the diameter of the emitted light measures greater than the diameter of at least the first aperture 3200). For example, the smallest diameter of each of the apertures 3200, 3202, and 3204, the taper angle γ, and/or the size of the optical emitter 3206 may affect the intensity of the emitted light within predetermined regions. As such, adjusting the smallest diameter of each of the apertures 3200, 3202, and 3204, the taper angle γ, and/or the size of the optical emitter 3206 may allow an intensity distribution of the emitted signal to be adjusted.

The taper angle γ may measure, for example, in a range extending between 0° to 180°. By way of further example, the taper angle γ may measure in a range of 40° to 80°. By way of still further example, the taper angle γ may measure in a range of 50° to 70°. By way of still further example, the taper angle γ may measure 60°.

The smallest diameter of the first aperture 3200 may measure, for example, in a range of 4 mm to 8 mm, the smallest diameter of the second aperture 3202 may measure, for example, in a range of 5.5 mm to 9.5 mm, and the smallest diameter of the third aperture 3204 may measure, for example, in a range of 7 mm to 10.5 mm. In some instances, the smallest diameter of the apertures 3200, 3202, and/or 3204 may be dynamically adjustable (e.g., using an adjustable shutter).

While the apertures 3200, 3202, and 3204 are generally illustrated with a circular shape, the apertures 3200, 3202, and 3204 are not limited to being circular. For example, the apertures 3200, 3202, and/or 3204 can be square-shaped, elliptical-shaped, octagonal-shaped, and/or any other shape. While the tapered surfaces 3305, 3307, and 3307 are generally shown as diverging in a direction moving away from the optical emitter 3206, in some instances, the tapered surfaces 3305, 3307, and 3307 may be converging in a direction moving away from the optical emitter 3206.

Figure 34:
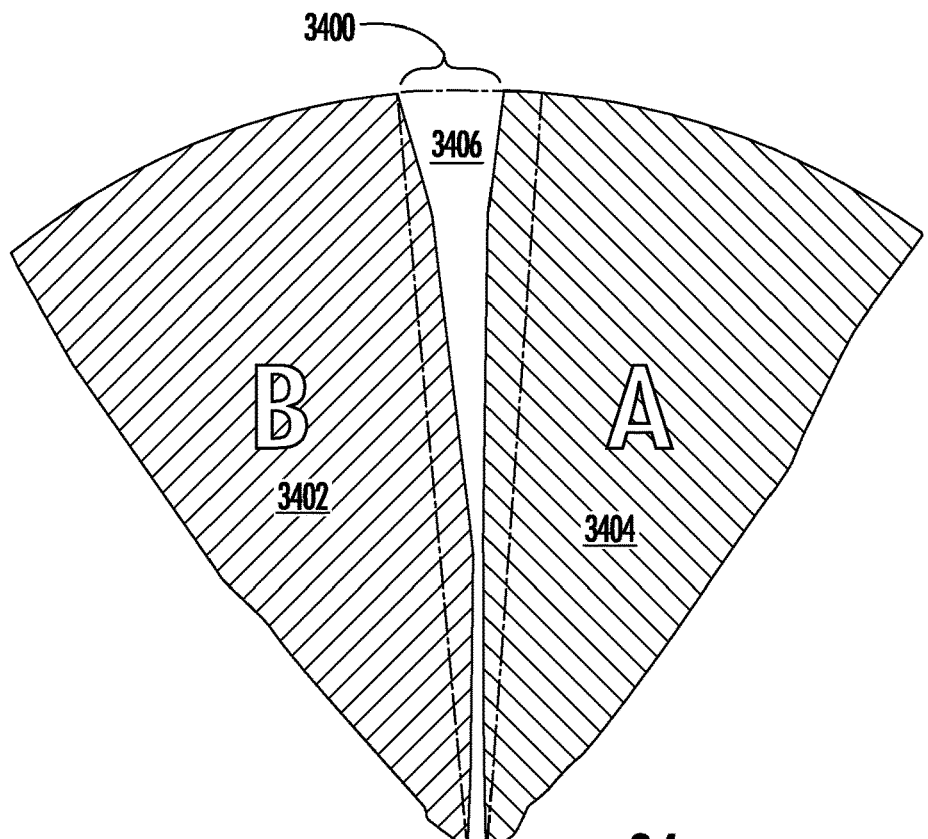
FIG. 34 is an example of an emission pattern corresponding to the transmitter shadow box housing of FIG. 31, consistent with embodiments of the present disclosure.
Figure 35:
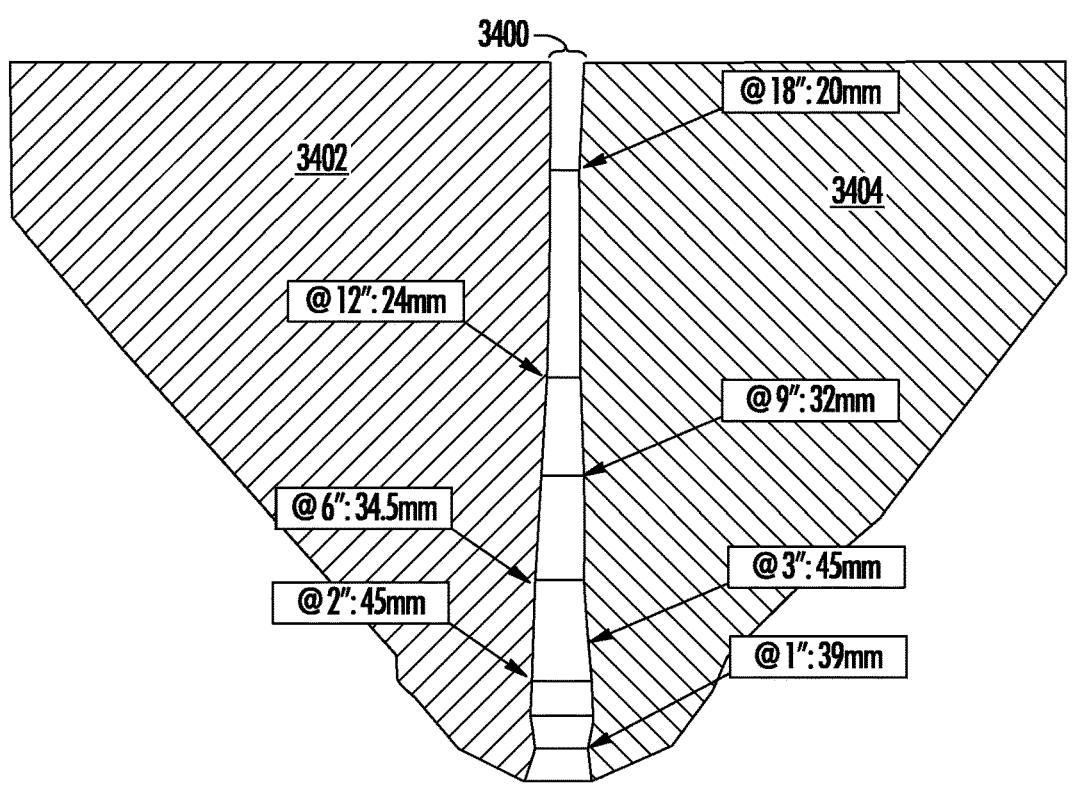
FIG. 35 is a magnified view of a portion of the emission pattern of FIG. 34, consistent with embodiments of the present disclosure.

FIG. 34 shows an example of an emission pattern that corresponds to the shadow box housing 3100. The illustrated emission pattern is shown extending 1.8288 m (or 6 feet) from the shadow box housing 3100. As shown, a gap 3400 extends between a first signal 3402 and a second signal 3404. The first signal 3402 corresponds to light emitted from the first shadow box 3102 and the second signal 3404 corresponds to light emitted from the second shadow box 3106. At least a portion of a third signal 3406 can extend within the gap 3400 between the first and second signals 3402 and 3404. FIG. 35 shows a magnified view of the emission pattern of FIG. 34 such that a width of the gap 3400 at various distances from the shadow box housing 3100 can be illustrated.

Figure 36:
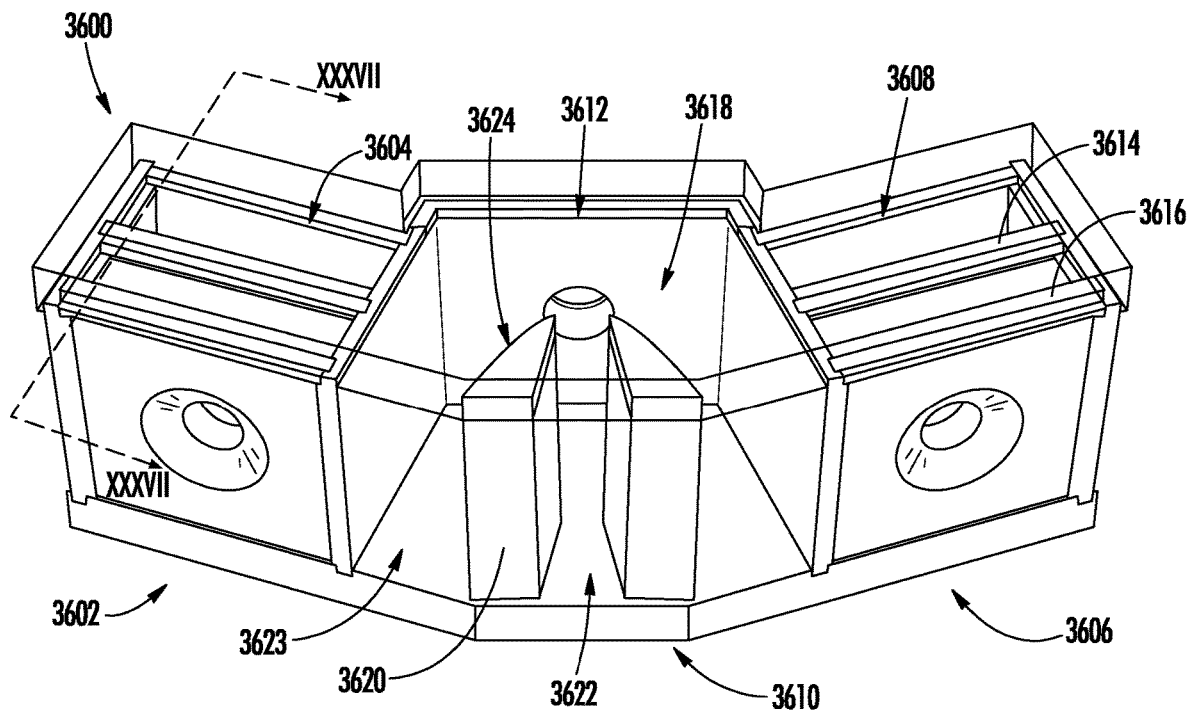
FIG. 36 is a perspective view of a transmitter shadow box housing, which may be an example of the transmitter shadow box housing of FIG. 30, consistent with embodiments of the present disclosure.

FIG. 36 shows a top perspective view of a transmitter shadow box housing 3600, which may be an example of the transmitter shadow box housing 3000 of FIG. 30. A portion of the transmitter shadow box housing 3600 is shown as transparent for purposes of clarity. As shown, the transmitter shadow box housing 3600 includes a first transmitter shadow box 3602 defining a first transmitter compartment 3604, a second transmitter shadow box 3606 defining a second transmitter compartment 3608, and a third transmitter shadow box 3610 defining a third transmitter compartment 3612.

The first and second compartments 3604 and 3608 each include first and second dividers 3614 and 3616. The first and second dividers 3614 and 3616 are configured such that light can pass through a portion of each of the dividers 3614 and 3616. As such, the first and second dividers 3614 and 3616 can be configured to shape light passing therethrough to have, for example, a predetermined shape and/or size when emitted from a respective shadow box 3602 or 3606.

The third compartment 3612 can include an optical shaper 3618. As shown, the optical shaper includes a plurality of optical barriers 3620 such that an optical channel 3622 is defined between the plurality of barriers 3620. The optical channel 3622 is configured to shape light emitted from the third compartment 3612. A plurality of dispersion channels 3623 are disposed on opposing sides of the optical channel 3622 and are defined, at least in part, by a directing surface 3624 of a respective one of the barriers 3620. The optical dispersion channels 3623 are configured to reduce the intensity of the light emitted therefrom.

Figure 37:
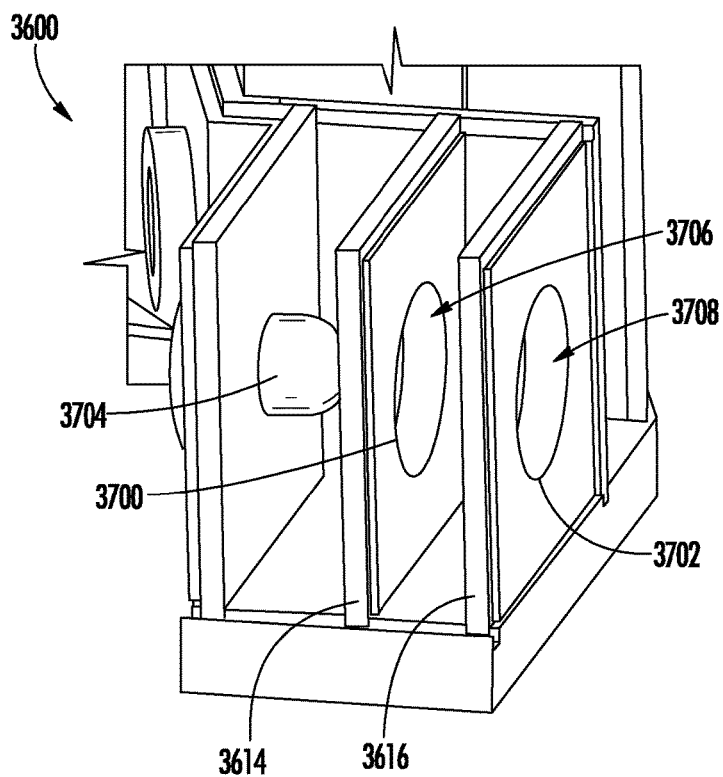
FIG. 37 is a perspective cross-sectional view of the transmitter shadow box housing of FIG. 36 taken along the line XXXVII-XXXVII, consistent with embodiments of the present disclosure.

FIG. 37 is a perspective cross-sectional view of the transmitter shadow box housing 3600 taken along the line XXXVII-XXXVII of FIG. 36. As shown, the first and second dividers 3614 and 3616 each include a respective aperture 3700 and 3702 through which light generated by an optical emitter 3704 (e.g., a light emitting diode) passes. For example, and as shown, the apertures 3700 and 3702 can each have a circular shape, wherein a measure of a diameter of each of the apertures 3700 and 3702 increases with increasing distance from the optical emitter 3704. As also shown, each aperture 3700 and 3702 can include a respective tapered region 3706 and 3708.

The smallest diameter of the first aperture 3700 may measure, for example, in a range of 2.0 mm to 10.0 mm and the smallest diameter of the second aperture 3702 may measure, for example, in a range of 2.5 mm to 10.5 mm. In some instances, the smallest diameter of the apertures 3700 and/or 3702 may be dynamically adjustable (e.g., using an adjustable shutter).

While the apertures 3700 and 3702 are generally illustrated with a circular shape, the apertures 3700 and 3702 are not limited to being circular. For example, the apertures 3700 and/or 3702 can be square-shaped, elliptical-shaped, octagonal-shaped, and/or any other shape. While the tapered surfaces defining the tapered regions 3706 and 3708 are generally shown as diverging in a direction moving away from the optical emitter 3704, in some instances, they may be converging in a direction moving away from the optical emitter 3704.

Figure 38:
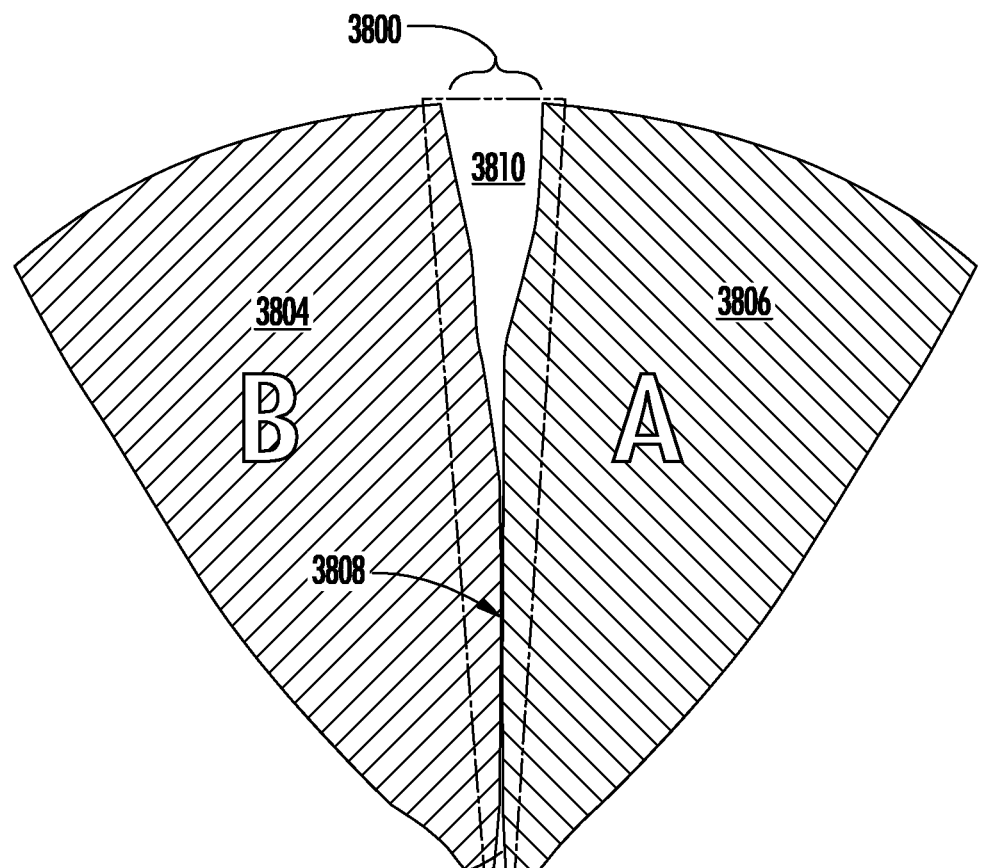
FIG. 38 is an example of an emission pattern corresponding to the transmitter shadow box housing of FIG. 36, consistent with embodiments of the present disclosure.
Figure 39:
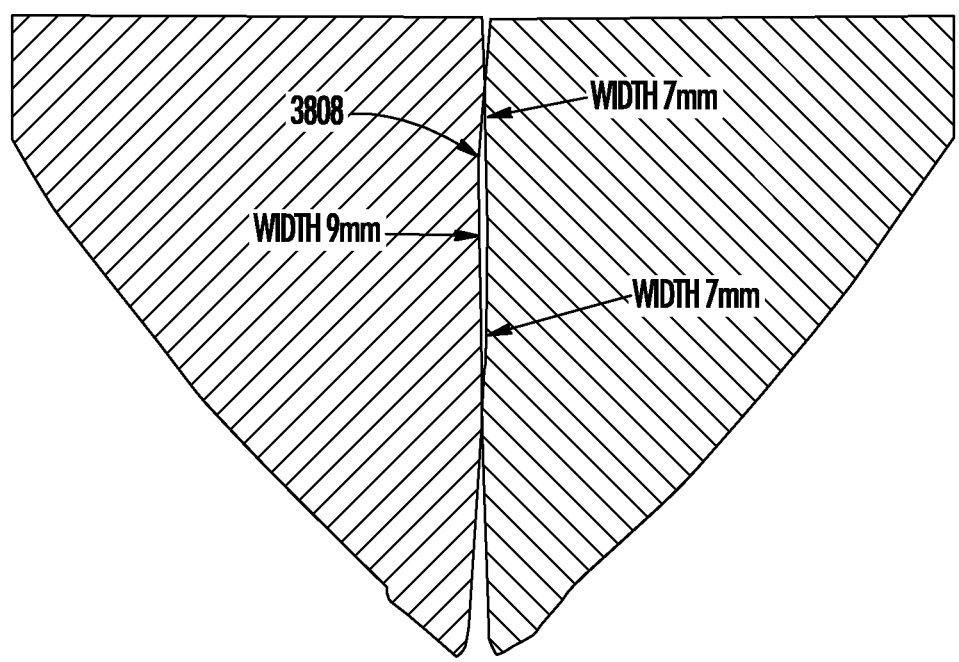
FIG. 39 is a magnified view of the emission pattern of FIG. 38, consistent with embodiments of the present disclosure.

FIG. 38 shows an example of an emission pattern that corresponds to the transmitter shadow box housing 3600. The emission pattern illustrated extends six feet from the transmitter shadow box housing 3600. As shown, a first gap 3800 and a second gap 3802 extend between a first signal 3804 and a second signal 3806, the second gap 3802 is spaced apart from the first gap 3800. An overlap region 3808 may extend between the first and second gaps 3800 and 3802. At least a portion of a third signal 3810 extends within the first and second gaps 3800 and 3802 and through the overlap region 3808 such that a robotic cleaner can follow the third signal 3810. FIG. 39 shows a magnified view of the emission pattern of FIG. 38 such that a width of the overlap region 3808 at various locations can be illustrated.

Figure 40:
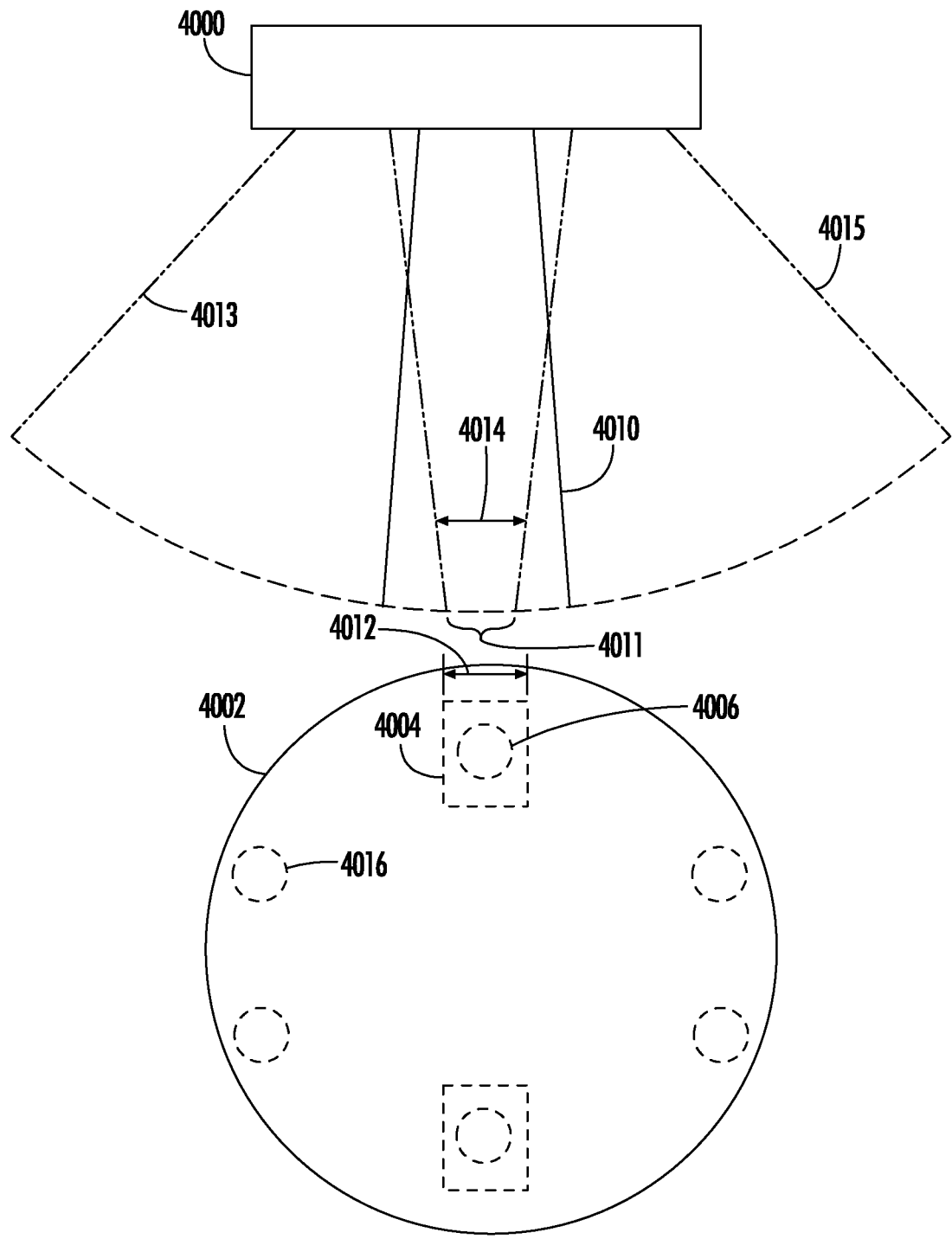
FIG. 40 is a schematic example of a docking station and a robotic cleaner, consistent with embodiments of the present disclosure.

FIG. 40 is a schematic example of a docking station 4000 and a robotic cleaner 4002, which may be examples of the docking station 10 and robotic cleaner 12, respectively, of FIG. 1A. As shown, the robotic cleaner 4002 includes a receiver shadow box housing 4004 (shown in hidden lines) configured to have one or more receivers 4006 (shown in hidden lines) disposed therein. The receivers 4006 are configured to detect a middle signal 4010 emitted by the docking station 4000 and extending within a gap 4011 between side signals 4013 and 4015 (e.g., left and right signals). A measure of a receiver shadow box housing opening width 4012 may generally correspond to a measure of a gap width 4014 corresponding to the gap 4011. For example, the receiver shadow box housing opening width 4012 may measure substantially equal to a measure of a narrowest measure of the gap width 4014. Such a configuration, may allow the robotic cleaner 4002 to more accurately follow the middle signal 4010 by, for example, limiting (e.g., preventing) interference caused by side signals 4013 and 4015.

In some instances, the robotic cleaner 4002 may include a plurality of receiver shadow box housings 4004, each having one or more of the receivers 4006. The receiver shadow box housings 4004 may be disposed on opposing sides of the robotic cleaner 4002. For example, each receiver shadow box housing 4004 may be disposed along a central axis that extends substantially parallel to a direction of forward movement of the robotic cleaner 4002. When a plurality of receiver shadow box housings 4004 are used, the robotic cleaner 4002 may approach the docking station 4000 in a first direction using one or more of the receivers 4006 disposed within one of the receiver shadow box housings 4004 and, upon reaching a predetermined distance from the docking station 4000, the robotic cleaner 4002 can be configured to rotate (e.g., substantially 180°) and move in a second direction (that is substantially opposite the first), and use one or more of the receivers 4006 of the other of the receiver shadow box housings 4004 to align with the docking station 4000 in order to move into engagement (e.g., contact) with the docking station 4000.

In some instances, the robotic cleaner 4002 can include a plurality of side sensors 4016 (shown in hidden lines) disposed on opposing sides of the receiver shadow box housing 4004. The side sensors 4016 can be configured to determine a pose of the robotic cleaner 4002 relative to the docking station 4000 based on which sensor(s) 4016 detects, for example, the middle signal 4010 and/or the side signals 4013 and 4015.

Figure 41:
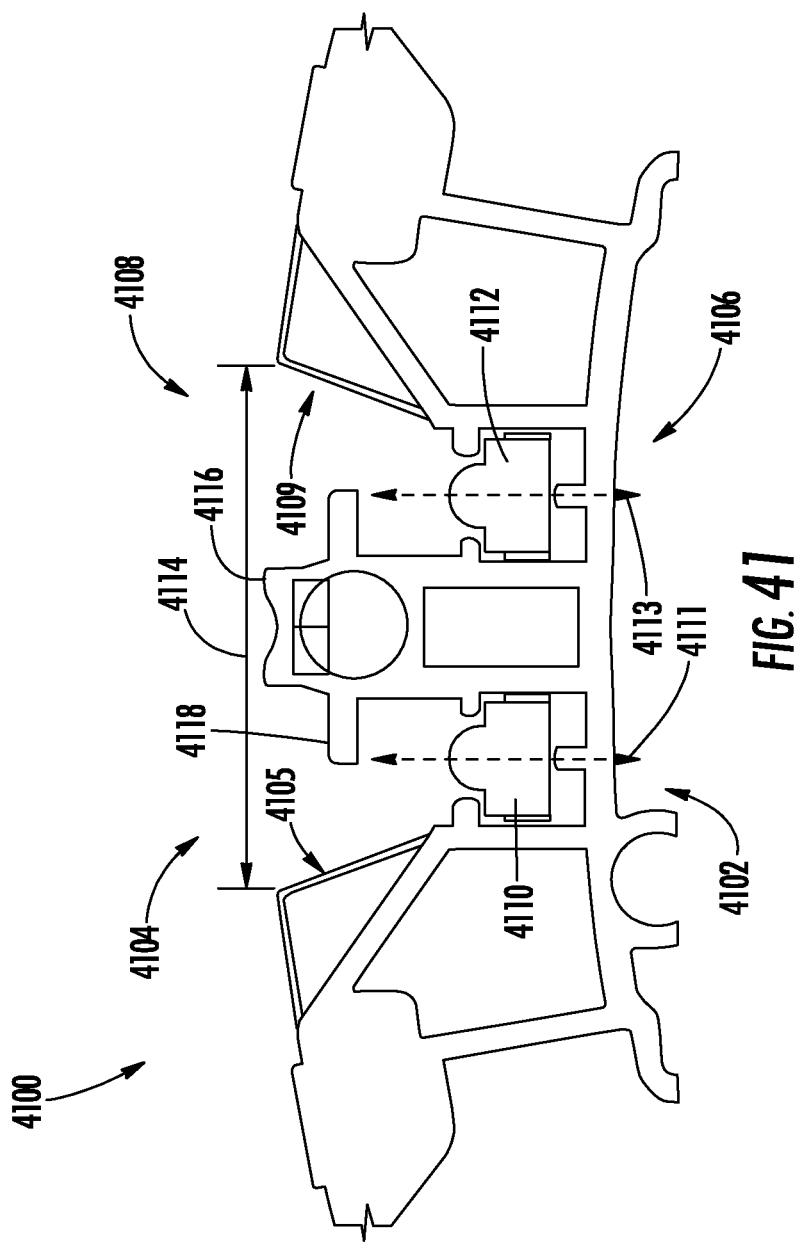
FIG. 41 is an example of a receiver shadow box housing configured to be used with the robotic cleaner of FIG. 40, consistent with embodiments of the present disclosure.

FIG. 41 shows a cross-sectional view of a receiver shadow box housing 4100, which may be an example of the receiver shadow box housing 4004 of FIG. 40. As shown, the receiver shadow box housing 4100 includes a first receiver shadow box 4102 defining a first receiver compartment 4104 and a second receiver shadow box 4106 defining a second receiver compartment 4108. The first compartment 4104 is configured to receive at least a portion of a first optical receiver 4110 and the second compartment 4108 is configured to receive at least a portion of a second optical receiver 4112. The first and second compartments 4104 and 4108 can each be at least partially defined by a respective directing surface 4105 and 4109. The directing surfaces 4105 and 4109 can extend transverse to a reception axis 4111 and 4113 of a respective one of the first and second optical receivers 4110 and 4112.

As shown, the directing surfaces 4105 and 4109 diverge in a direction away from the first and second optical receivers 4110 and 4112. In other words, a measure of a separation distance 4114 extending between the directing surfaces 4105 and 4109 increases with increasing distance from the first and second optical receivers 4110 and 4112. The separation distance 4114 may, for example, measure, at its maximum, substantially equal to a narrowest width of a detectable signal generated by the docking station 4000 of FIG. 40.

As shown, an optical barrier 4116 separates the first compartment 4104 from the second compartment 4108. The optical barrier 4116 includes optical shields 4118 that are spaced apart from and that extend at least partially over a respective one of the first and/or second optical receivers 4110 and 4112. As such, the optical shields 4118 extend at least partially within respective ones of the first and second compartments 4104 and 4108.

Figure 42:
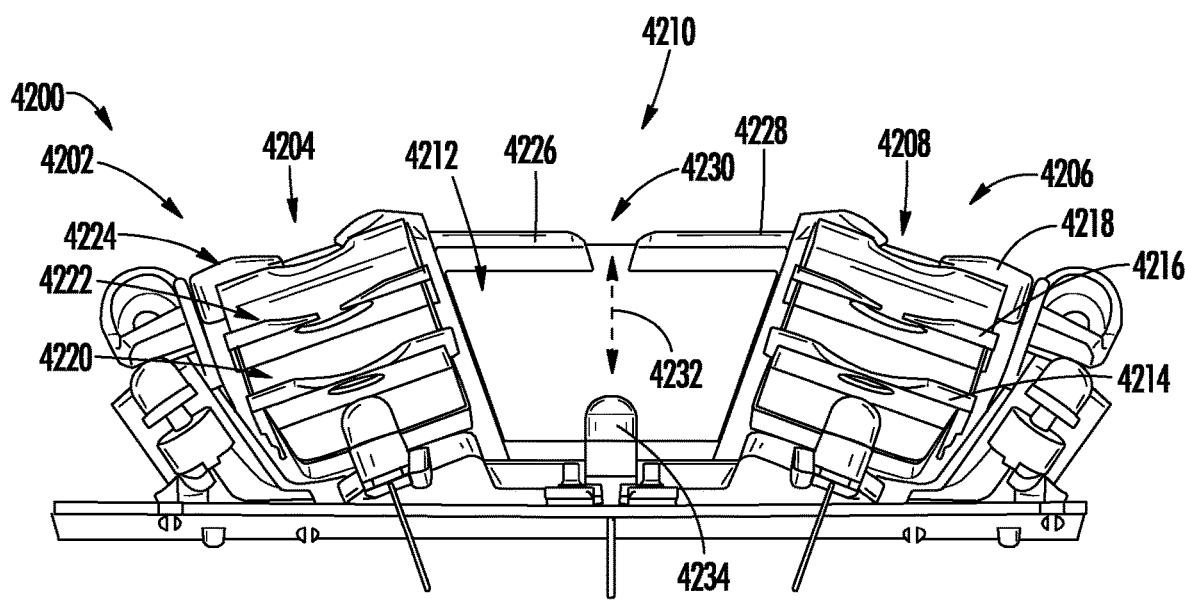
FIG. 42 is a perspective cross-sectional view of a transmitter shadow box housing, consistent with embodiments of the present disclosure.

FIG. 42 shows a perspective cross-sectional view of an example of a transmitter shadowbox housing 4200. As shown the transmitter shadowbox housing 4200 includes a first transmitter shadow box 4202 defining a first transmitter compartment 4204, a second transmitter shadow box 4206 defining a second transmitter compartment 4208, and a third transmitter shadow box 4210 defining a third transmitter compartment 4212. As shown, the third transmitter shadow box 4210 is disposed between the first and second transmitter shadow boxes 4202 and 4206. The first and second transmitter shadow boxes 4202 and 4206 each include a first, second, and third divider 4214, 4216, and 4218. Each of the first, second, and third dividers 4214, 4216, and 4218 include apertures 4220, 4222, and 4224 through which light can pass. The apertures 4220, 4222, and 4224 can be configured to shape light that passes therethrough.

As also shown, the third transmitter shadow box 4206 includes a first and second optical shield 4226 and 4228 that each extend from opposing sides of the third transmitter compartment 4212. The first and second optical shields 4226 and 4228 extend into the third transmitter compartment to define an optical channel 4230 through which light is emitted. As shown, the optical channel 4230 can be aligned with a central axis 4232 of a corresponding optical emitter 4234. The optical channel 4230 can be configured to shape light that passes therethrough.

An example of a docking station for a robotic cleaner, consistent with the present disclosure, may include a housing, at least one charging contact coupled to the housing, and at least three optical emitters disposed within the housing. The at least three optical emitters may include a first optical emitter configured to generate a first optical signal within a first field of emission, a second optical emitter configured to generate a second optical signal within a second field of emission, and a third optical emitter configured to generate a third optical signal within a third field of emission. The third optical emitter may be disposed between the first and second optical emitters and the first, second, and third optical signals may be different from each other, wherein the third optical signal is configured to guide a robotic cleaner in a direction of the housing.

In some instances, the first and second fields of emission may not have substantial overlap within a detection zone. In some instances, at least a portion of the third field of emission may extend in a region between the first and second fields of emission, the region corresponding to a location where the robotic cleaner detects the third optical signal in an absence of the first and second optical signals. In some instances, at least a portion of the first, second, and third fields of emission may overlap each other for at least a portion of a detection zone. In some instances, the docking station may further include at least three shadow boxes disposed within the housing, each shadow box corresponding to a respective one of the first, second, and third optical emitters. In some instances, the first and second optical emitters may be angled relative to the third optical emitter. In some instances, the first, second, and third optical emitters may be aligned along a common horizontal plane. In some instances, the third optical emitter may be vertically offset from the first and second optical emitters. In some instances, the first and second optical emitters may be aligned along a common horizontal plane.

An example of a robotic cleaning system, consistent with the present disclosure, may include a robotic cleaner having at least one optical receiver and a docking station having at least one charging contact and at least three optical emitters. The at least three optical emitters may include a first optical emitter configured to generate a first optical signal within a first field of emission, a second optical emitter configured to generate a second optical signal within a second field of emission, and a third optical emitter configured to generate a third optical signal within a third field of emission. The third optical emitter may be disposed between the first and second optical emitters and the first, second, and third optical signals may be different from each other, wherein the third optical signal is configured to guide the robotic cleaner in a direction of the docking station.

In some instances, the first and second optical fields of emission may not have substantial overlap within a detection zone. In some instances, at least a portion of the third field of emission may extend in a region between the first and second fields of emission, the region corresponding to a location where the robotic cleaner detects the third optical signal in an absence of the first and second optical signals. In some instances, the first, second, and third fields of emission may overlap each other for at least a portion of a detection zone. In some instances, the robotic cleaning system may include at least three shadow boxes disposed within the docking station, each shadow box corresponding to a respective one of the first, second, and third optical emitters. In some instances, the first and second optical emitters may be angled relative to the third optical emitter. In some instances, the first, second, and third optical emitters may be aligned along a common horizontal plane. In some instances, the third optical emitter may be vertically offset from the first and second optical emitters. In some instances, the first and second optical emitters may be aligned along a common horizontal plane. In some instances, when the at least one optical receiver detects one of the first or second optical signals, the robotic cleaner may be caused to move towards the third optical signal. In some instances, when the at least one optical receiver detects the third optical signal, the robotic cleaner may be caused to follow the third optical signal until the robotic cleaner engages the docking station such that the robotic cleaner is electrically coupled to the at least one charging contact.

While the disclosure herein has generally disclosed the signal emitters as being disposed on a docking station and the signal receivers as being disposed on the robotic cleaner, in some instances the signal emitters can be disposed on the on the robotic cleaner and the signal receivers can be disposed on the docking station. In these instances, the docking station can be configured to communicate movement signals that are based on the signals emitted from the robotic cleaner to the robotic cleaner such that the robotic cleaner can adjust its position relative to the docking station. As such, the robotic cleaner can be navigated to the docking station based on communications received from the docking station.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A docking station for a robotic cleaner comprising:
   a housing;
   at least one charging contact coupled to the housing;
   at least three optical emitters disposed within the housing, the at least three optical emitters comprising:
      a first optical emitter configured to generate a first optical signal within a first field of emission;
      a second optical emitter configured to generate a second optical signal within a second field of emission; and
      a third optical emitter configured to generate a third optical signal within a third field of emission, the third optical emitter being disposed between the first and second optical emitters and the first, second, and third optical signals being different from each other, wherein the third optical signal is configured to guide a robotic cleaner in a direction of the housing;
   a first shadow box corresponding to the first optical emitter;
   a second shadow box corresponding to the second optical emitter, the first and the second shadow boxes each having a first divider, a second divider, and a third divider, each divider having a corresponding aperture that shapes light that passes therethrough; and
   a third shadow box corresponding to the third optical emitter, the first, second, and third shadow boxes being disposed within the housing.

2. The docking station of claim 1, wherein the first and second fields of emission do not have substantial overlap within a detection zone.

3. The docking station of claim 2, wherein at least a portion of the third field of emission extends in a region between the first and second fields of emission, the region corresponding to a location where the robotic cleaner detects the third optical signal in an absence of the first and second optical signals.

4. The docking station of claim 1, wherein at least a portion of the first, second, and third fields of emission overlap each other for at least a portion of a detection zone.

5. The docking station of claim 1, wherein the first and second optical emitters are angled relative to the third optical emitter.

6. The docking station of claim 1, wherein the first, second, and third optical emitters are aligned along a common horizontal plane.

7. The docking station of claim 1, wherein the third optical emitter is vertically offset from the first and second optical emitters.

8. The docking station of claim 7, wherein the first and second optical emitters are aligned along a common horizontal plane.

9. A robotic cleaning system comprising:
   a robotic cleaner having at least one optical receiver; and
   a docking station having:
      at least one charging contact;
      at least three optical emitters, the at least three optical emitters comprising:
         a first optical emitter configured to generate a first optical signal within a first field of emission;
         a second optical emitter configured to generate a second optical signal within a second field of emission; and
         a third optical emitter configured to generate a third optical signal within a third field of emission, the third optical emitter being disposed between the first and second optical emitters and the first, second, and third optical signals being different from each other, wherein the third optical signal is configured to guide the robotic cleaner in a direction of the docking station;
      a first shadow box corresponding to the first optical emitter;
      a second shadow box corresponding to the second optical emitter, the first and the second shadow boxes each having a first divider, a second divider, and a third divider, each divider having a corresponding aperture that shapes light that passes therethrough; and
      a third shadow box corresponding to the third optical emitter.

10. The robotic cleaning system of claim 9, wherein the first and second optical fields of emission do not have substantial overlap within a detection zone.

11. The robotic cleaning system of claim 10, wherein at least a portion of the third field of emission extends in a region between the first and second fields of emission, the region corresponding to a location where the robotic cleaner detects the third optical signal in an absence of the first and second optical signals.

12. The robotic cleaning system of claim 9, wherein the first, second, and third fields of emission overlap each other for at least a portion of a detection zone.

13. The robotic cleaning system of claim 9, wherein the first and second optical emitters are angled relative to the third optical emitter.

14. The robotic cleaning system of claim 9, wherein the first, second, and third optical emitters are aligned along a common horizontal plane.

15. The robotic cleaning system of claim 9, wherein the third optical emitter is vertically offset from the first and second optical emitters.

16. The robotic cleaning system of claim 15, wherein the first and second optical emitters are aligned along a common horizontal plane.

17. The robotic cleaning system of claim 9, wherein, when the at least one optical receiver detects one of the first or second optical signals, the robotic cleaner is caused to move towards the third optical signal.

18. The robotic cleaning system of claim 17, wherein, when the at least one optical receiver detects the third optical signal, the robotic cleaner is caused to follow the third optical signal until the robotic cleaner engages the docking station such that the robotic cleaner is electrically coupled to the at least one charging contact.

\* \* \* \* \*